US007222002B2

(12) United States Patent
Maine

(10) Patent No.: US 7,222,002 B2
(45) Date of Patent: May 22, 2007

(54) VIBRATION ENGINE MONITORING NEURAL NETWORK OBJECT MONITORING

(75) Inventor: Scott T. Maine, Fairfield, CA (US)

(73) Assignee: The Boeing Company, Chicago, IL (US)

( * ) Notice: Subject to any disclaimer, the term of this patent is extended or adjusted under 35 U.S.C. 154(b) by 664 days.

(21) Appl. No.: 10/794,837

(22) Filed: Mar. 5, 2004

(65) Prior Publication Data

US 2004/0249520 A1 Dec. 9, 2004

Related U.S. Application Data

(60) Provisional application No. 60/475,137, filed on May 30, 2003.

(51) Int. Cl.
*G01M 15/00* (2006.01)
*G05B 13/02* (2006.01)
*G06F 19/00* (2006.01)

(52) U.S. Cl. .............................. 701/3; 701/29; 701/31; 701/100; 702/56; 702/191; 706/15; 706/41

(58) Field of Classification Search .................... 701/3, 701/4, 8, 10, 29, 31, 35, 100, 111; 702/56, 702/182, 185, 191, 195; 706/15, 16, 41; 244/54; 381/71.4; 700/104, 280
See application file for complete search history.

(56) References Cited

U.S. PATENT DOCUMENTS

| | | | | | |
|---|---|---|---|---|---|
| 5,065,959 | A * | 11/1991 | Bhatia et al. | ................. | 244/54 |
| 6,002,778 | A * | 12/1999 | Rossetti et al. | ............ | 381/71.4 |
| 6,185,470 | B1 * | 2/2001 | Pado et al. | ................ | 700/104 |
| 6,983,199 | B2 * | 1/2006 | Mollmann et al. | ............ | 701/29 |
| 2005/0125103 | A1 * | 6/2005 | Ferrer | ........................ | 700/280 |

* cited by examiner

*Primary Examiner*—Tan Q. Nguyen
(74) *Attorney, Agent, or Firm*—Robert R. Richardson, P.S.

(57) ABSTRACT

The present invention provides an aircraft engine vibration system that provides information about engine health. Embodiments of the present invention monitor for excessive vibration, monitor for bird strike, monitor for ice build up on the fan section, and monitor general engine health. An embodiment of the present invention utilizes neural network architecture for the detection of excessive vibration and ice detection build-up on the fan section of a turbo-fan engine and to monitor engine health through the high-pressure turbine section of the engine.

71 Claims, 11 Drawing Sheets

VIBRATION ENGINE MONITORING NEURAL NETWORK OBJECT MONITORING

RELATED APPLICATION

This patent application claims the benefit of priority from U.S. provisional patent application Ser. No. 60/475,137, filed May 30, 2003, the entire contents of which are hereby incorporated by reference.

FIELD OF THE INVENTION

The present invention relates generally to monitoring and, more specifically, to monitoring vibration.

BACKGROUND OF THE INVENTION

In the past, sensing of vibration in aircraft engines was more of an art than science. For example, a pilot felt for vibration in the throttle handles, through the pilot's seat, or even noticing that ripples in the pilot's coffee were agitated more than normal. Often, aircraft vibrations were extremely difficult to duplicate for ground mechanics. As a result, flying mechanics on aircraft was a common practice to illustrate that there was a vibration problem on the aircraft and to prove to ground crews that the aircraft truly had a problem.

Increasing complexity of aviation systems over the years has caused greater confusion among flight crews as to what actually was the source of the vibration. More often than not the flight crew would blame the engine as the cause of the vibration. Due to escalating costs of engine removal and repair of the engine off the aircraft, there is a great reluctance to remove an engine from an aircraft and a greater need for monitoring general engine health.

The Federal Aviation Administration has required operators flying within United States airspace to have engine vibration monitoring equipment installed and operable on all commercial aircraft. The currently known method of measuring engine vibration is to utilize two transducers. One transducer monitors the fan section of the engine and is mounted directly onto the fan. A second transducer monitors the high-pressure section, or core, of the engine and is mounted aft over the core. The transducer output is a spurious direct current output that is input into a charge amplifier. The charge amplifier amplifies the input and multiplies the input by a sine wave that is set at a known frequency. Generally, the charge amplifier is mounted in the engine pylon.

The output of the charge amplifier is run through twisted wire, shielded pair that terminates in a control box in the avionics bay. The signal processing for the engine vibration system is computed within the control box, where a Fourier Transform of the vibration is taken. The Fourier Transform of the engine vibration for the fan is the amount of vibration of the fan divided by the fan speed. The Fourier Transform of the engine vibration for the high-pressure turbine is the turbine vibration divided by the turbine speed. Recent advancements in monitoring engine vibrations include use of a fan-tracking filter that samples the speed of the turbofan and an engine core speed-tracking filter that samples the speed of the engine core. The introduction of these filters has increased the reliability of the engine vibration monitoring system.

The output of the control box is a numeric display viewable by the pilot. This numeric display is represented in mils (1/1000 inch) of engine displacement. Accordingly, present indications of engine vibration monitoring systems are limited to providing flight crew information in numbers or bar indicators that offer a limited amount of information to the flight crew.

As such, current aircraft engine vibration monitoring systems do not provide flight crews and ground maintenance crews with information about engine health. This can lead to guessing by the flight crews and ground maintenance crews as to whether the engine vibration monitoring system is providing proper vibration alerting. Further, ice build-up on fan sections of aircraft can cause damage to engine acoustical panels or, in extreme cases, severe damage to compressor sections of the engine and or engines.

Because aircraft engines are high dollar assets, repairs are costly and operators are reluctant to take engines off-wing in response to false alerts from the vibration monitoring system. In an extreme case, this may lead to catastrophic failure.

As a result, ground crews may be reluctant to trust vibration-monitoring equipment that gives them inadequate information about engine health. Further, it is impractical to present the flight crew with a frequency spectrum and ask the flight crew to make decisions based on their inference of the spectrum. Thus, there is an unmet need in the art for an aircraft engine vibration system that provides information about engine health.

SUMMARY OF THE INVENTION

The present invention monitors an engine's vibration and provides information to operating and maintenance personnel about engine health. Embodiments of the present invention monitor an aircraft engine for a vibration condition such as excessive vibration, monitor for bird strike, monitor for ice build up on the fan section, and monitor general engine health. Alerts are provided to flight and maintenance crews regarding possible causes of the abnormal condition. As a result, maintenance crews may place increased confidence in information provided by the present invention over vibration monitoring known in the prior art. By providing the user with better information about the aircraft's engine(s), the present invention may save money and may help prevent catastrophic engine failure.

An exemplary embodiment of the present invention utilizes a neural network architecture for detecting excessive vibration and ice build-up on a fan section of a turbo-fan engine and for monitoring engine health through a high-pressure turbine section of the engine. A plurality of accelerometers is configured to sense a pattern of vibration of an engine. A neural network is configured to receive a pattern of outputs from the plurality of accelerometers. The network includes a first component configured to determine whether magnitude of the vibration exceeds a predetermined threshold. A second component is configured to analyze the pattern of vibration when the vibration exceeds the predetermined threshold, and a third component is configured to determine a cause of the excessive vibration based upon analysis of the pattern of vibration.

According to an aspect of the invention, two distinct sets of vectors are monitored: those vectors that are a fixed set in space described as $x_s$, $y_s$, and $z_s$, and those vectors that are in rotation about a shaft described as $x_r$, $y_r$, and $z_r$.

According to another aspect, output of a Hilbert Transform is presented to a trained Neural Network classifier for classification of the output as acceptable or not acceptable. If the output is not acceptable, then an alert is given to the pilot as an excessive engine vibration. If the output is acceptable, then the output is displayed utilizing set space neurons illustrating the triggered neuron or neurons. If the output is acceptable, then the system remembers the engine-operating pattern. If there is a change in the engine operating parameters, the pilot will be alerted with a visual indication of the change. A change in the output would occur if the engine fan were to suffer loss of weight, a bird were ingested, ice were to build up, or engine bearings were failing.

Embodiments of the present invention learn an engine's normal operating characteristics and know data relative to the normal operating characteristics. Via pattern recognition, embodiments of the present invention can alert a flight crew that the engine has suffered a bird strike, has abnormal bearing wear, has suffered a FOD event, or that ice has built up on the fan section.

According to an aspect of the present invention, embodiments of the present invention can learn which neuron sets are used in different cases and can then identify the condition that the engine is operating in and give flight crews accurate information regarding engine health. Use of neuron sets allows normal operational conditions of the engine to be learned. Using Set Space Neuron sets, random stimuli are introduced and learned. Depending upon changes in stimuli, a triggered neuron or set of triggered neurons can have cognitive memories assigned to one or many. The set of neurons that are activated can mean normal engine operation. Alternately, changing stimuli can mean a bird strike, bearing wear in the engine, ice build-up on the fan section of the engine, or a fan imbalance condition.

The methodology of presenting stimuli uses a Hilbert Transform instead of a Fast Fourier Transform Method as used by currently known methods. The output of the Hilbert Transform is the sum of the individual elements of the Fast Fourier Transform and is therefore a suitable method for presenting the stimuli. Use of the Hilbert Transform advantageously enables presenting the flight crew with the activated neurons that show the change in the engine health along with a possible cause(s) of the change. As a result, a proper decision on the part of the flight crew can be made.

Advantageously, flight crews can have a better understanding of the health of the operating engine, maintenance crews can understand what is wrong with the engine, and engine managers can have an ability to better track information about the engines in their fleet.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
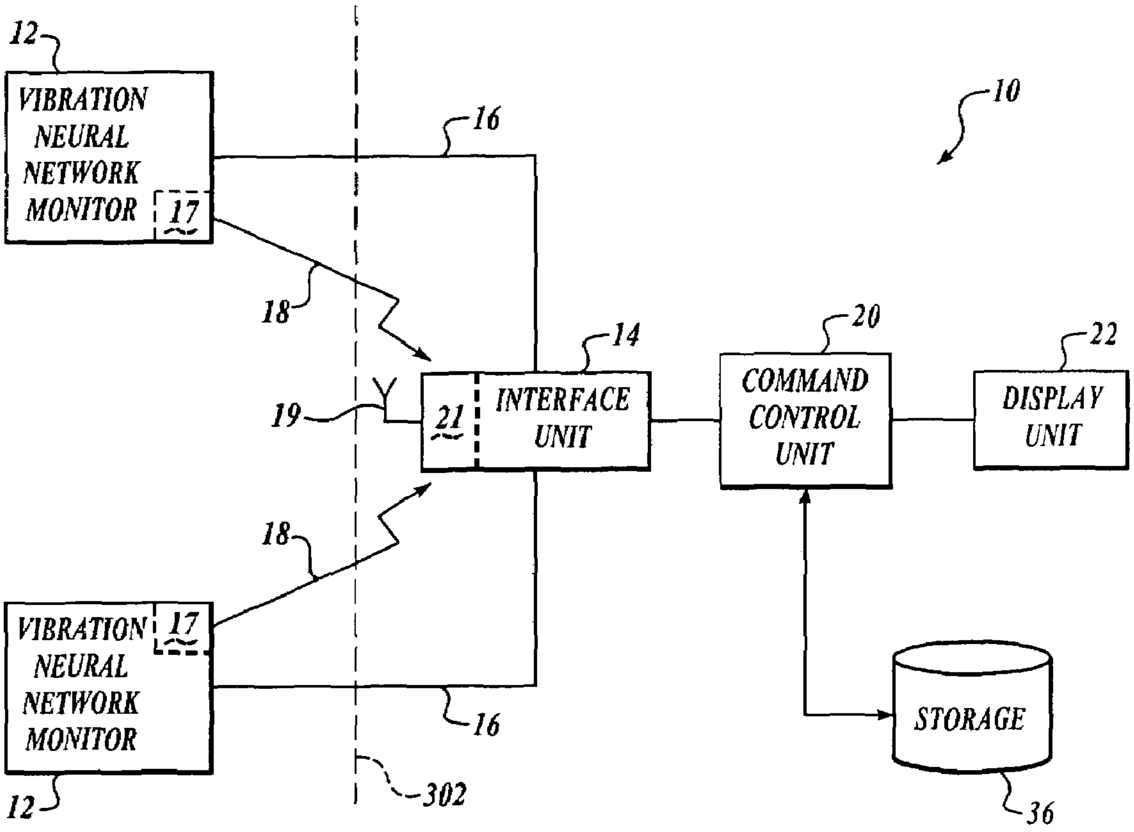
FIG. 1 is a block diagram of an exemplary engine vibration neural network monitor according to an embodiment of the present invention.

By way of overview and referring to FIG. 1, an exemplary system 10 for monitoring vibration of an engine (not shown) includes a neural network 12 for each engine. Each neural network 12 includes transducers (not shown) that are mounted on the engine for sensing vibration of the engine. Each neural network 12 learns steady state operating parameters of its associated engine and monitors for excessive vibration. If excessive vibration is detected, the neural network 12 looks at a pattern of outputs from its transducers and determines a possible cause of the excessive vibration, such as without limitation a bird strike, foreign object damage (FOD), or bearing failure. If excessive vibration is not detected, the transducer output pattern is monitored for possible ice build-up on the fan section of the engine or for a possible over-speed event. An alert is generated when any of the above conditions are detected. The output pattern and the alert are provided by the neural networks 12 to an interface unit 14 via electrical or optical connections 16 or, if desired, radiofrequency (RF) links 18. A command and control unit 20 receives the output pattern and the alert from the interface unit 14 and provides the output patterns and the alert to a display unit 22 for viewing by operating or maintenance crews. When the system 10 is implemented in an aircraft, the neural network 12 and the transmitter 17 are located outside a fuselage 302 of the aircraft; all other components of the system 10 are located inside the fuselage 302.

While an exemplary embodiment of the system 10 monitors an aircraft's engine(s), it will be appreciated that the system 10 may monitor any engine in any application setting as desired, such as a land vehicle, train, maritime vessel, land-based facility, or the like. As such, references throughout to an aircraft and a flight crew or pilot will be understood to be made by way of non-limiting example only.

Details of an exemplary embodiment will be set forth below. However, for sake of clarity, computational assumptions will be explained first.

Computational Assumptions

Premises and assumptions underlying the system 10 are that engine steady state operation remains stable during cruise at altitude; that changes in the engine causes changes to the operating characteristics of the engine; that a change in the operating characteristics causes a change in the operation that can be monitored; that the mechanical frequency operation is the frequency of modal analysis; and that all the signal processing is accomplished on the engine. The general operating characteristics of the engine are such that fan section vibration may be considered excessive if it exceeds a predetermined threshold of vibration, such as without limitation around 3 mils (1 mil=1/1000 inch) or so of vibration and high-pressure section vibration may be considered excessive if it exceeds around one mil or so of vibration.

In a presently preferred embodiment, the system 10 utilizes a Hilbert Transform, where the Hilbert Transform positive output is the sum of individual components of a Fourier Transform. The system 10 monitors for pure vibration through two channels per vibration monitoring section. Each vibration monitoring section includes a channel X and a channel Y. Each channel makes up one half of the Hilbert Transform, and the section completes the Hilbert Transform. A section monitors either the fan or high-pressure engine stages.

The purpose for utilizing the Hilbert Transform is twofold. The first advantage to utilizing the Hilbert Transform is that the Hilbert Transform has as an output a natural phase angle. The second advantage is that the Hilbert Transform allows for a vector display in real time to an operating crew, such as a flight crew, thereby giving the flight crew a visual display of the health of the engine or engines. Advantageously, the display that the flight crew sees is substantially a visual indication of an engine's vibration signature. The system 10 is based not on the premise that every engine model has the same signature, but rather that each individual engine has its own signature. It is the premise that the system 10 will learn each individual engine signature, remember this signature, and alert the flight crew when the signature has changed.

The system 10 monitors two distinct sets of vectors: those vectors that are the fixed set in space described as $x_s$, $y_s$, and $z_s$, and those vectors that are in rotation about an engine's shaft described as $x_r$, $y_r$, and $z_r$. Exemplary equations that describe the vectors monitored by the system 10 are as follows:

For the engine fan section:

$$x_r = x_s \cos \text{omega}_z t + y_s \sin \text{omega}_z t. \quad (1.0)$$

For the engine high-pressure section:

$$y_r = y_s \cos \text{omega}_z t - x_s \sin \text{omega}_z t. \quad (1.1)$$

The equation representation fits into the Hilbert Transform where:

$$S(t) = x(t) + jy(t) \quad (1.2)$$

$$S(t) = x(t)\cos 2pif_c t - y(t)\sin 2pif_c t \quad (1.3)$$

$$S_{hat}(t) = x(t)\cos 2pif_c t - y(t)\sin 2pif_c t \quad (1.4)$$

$$S(t) = Re[x(t) + jy(t)]e^{j2pifct} \quad (1.5)$$

$$S(t) = Re[s_1(t)e^{j2pifct} \quad (1.6)$$

$$S_1(t) = a(t)e^{j\ theta(t)} \quad (1.7)$$

$$A(t) = SQRT(x^2 + y^2) \quad (1.8)$$

$$Theta(t) = \tan^{-1} y(t)/x(t) \quad (1.9)$$

From equations (1.0)–(1.4), the operational frequency of the engine fan and core speeds are used to satisfy the requirements for $f_c$ and $\text{omega}_z$. By substitution, the following equation is made from equation (1.8):

$$C = SQRT(A^2 + B^2) \quad (2.0)$$

where C is the vector output generated by the Hilbert Transform and A and B are scalars of C. The phase angle that is represented by Theta (t) is then dealt with.

As is known, the Hilbert Transform has both real and imaginary elements. However, the imaginary elements of the Hilbert Transform are real and are treated as such. Modern modal analysis schemes convert the output of the Hilbert Transform to eigen-values and ignore the small amount of phase angle. This is the approach that is implemented in a presently preferred embodiment of the invention. However, it will be appreciated that the phase angle is important in determining engine health by the pilot after a bird strike or ice build up on the fan section of the engine. This will be shown below to be a useful tool.

For purposes of simplification, the absolute value of the scalars A and B is used. This avoids dealing with complex numbers. However, it will be appreciated that this approach may slightly limit the amount of useful information to the pilot.

The output of the Hilbert Transform is presented to a trained Neural Network classifier for classification of the output as acceptable or not acceptable. If the output is not acceptable, then an alert is given to the pilot as an excessive engine vibration. If the output is acceptable, then the output is displayed on the display unit 22 utilizing set space neurons illustrating the triggered neuron or neurons. If the output is acceptable, the system 10 remembers the engine-operating pattern. If there is a change in the engine operating parameters, the system 10 alerts the pilot with a visual indication of the change. For example, a change in the output would occur if the engine fan were to suffer loss of weight, a bird were ingested, ice were to build up, or engine bearings were failing.

Exemplary Embodiment

A discussion of an exemplary embodiment given by way of non-limiting example appears below. Accelerometers and their measurements are first discussed, followed by an overview of outputs of the accelerometers in neuron displacement. A more detailed explanation of the system 10 is then set forth. An exemplary software implementation is explained, followed by a discussion of neuron set spaces and neuron activation for normal and abnormal operating conditions of an engine.

Accelerometers and their Measurements

Figure 2A:
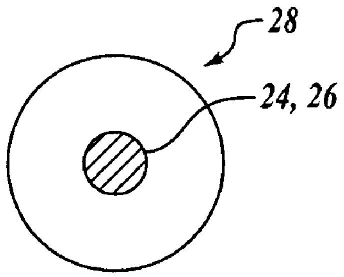
FIGS. 2A and 2B illustrate placement of accelerometers on an engine.
Figure 2B:
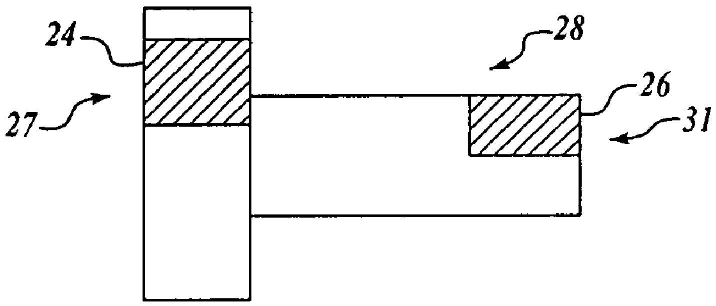

In one exemplary embodiment and referring now to FIGS. 1, 2A, and 2B, accelerometers 24 and 26 mounted to each engine 28 measure vibration of the engine in terms of velocity of displacement. Each accelerometer 24 and 26 has an output for the X and Y-axes of the engine 28. This corresponds to a Cartesian two-dimensional plane. As shown in FIG. 2A, the accelerometers 24 and 26 suitably are located along a central axis of the engine 28. However, the accelerometers 24 and 26 may be located about a periphery of the engine 28, if desired, or anywhere in-between the axis and periphery of the engine 28. As shown in FIG. 2B, the accelerometer 24 is placed forward on a fan section 27 of the engine 28. The accelerometer 26 is placed aft on a core 31 of the engine 28. The forward accelerometer 24 measures vibration of the fan section 27 (or low compression section) and the aft accelerometer 26 measures vibration of the core 31 (or high compression section) of the engine 28. The system 10 can then determine the angular velocity of the engine 28 and provide recommendations for repairs to the engine 28 based on that information.

Large, turbofan engines for aircraft commercial, such as those manufactured by General Electric Co. and Pratt and Whitney, utilize fan and core vibration monitoring. As is known, speed of the fan section 27 is referred to as N1 and speed of the core section 31 is referred to as N2. Vibration is monitored by measuring acceleration of movement about the radial axes of the engine. As a result, analysis of engine vibration is dependent upon the operating frequency of the engine 28. It will be appreciated that that engine vibration will occur at around the operating frequency of the engine as the engine vibration is obeying the laws of reciprocity.

However, gear mesh and impact frequencies are not considered, as they are a direct result of the engine vibration problem.

Movement about the radial axes of the engine is measured on the engine 28 as the engine displacement, or the amount of movement the engine displaces along its radial axes. As is known, the mil has long been utilized by engine manufacturers as the measurement of displacement. One mil is equivalent to 0.001 inch or 0.0254 mm. The generally acceptable amount of engine vibration during test and validation from engine manufacturing is on the order of around 3 mils or less.

Tables 1 and 2 illustrate relationships between operating frequency of the fan and core of the engine, respectively, and engine parameters that indicate operation of the engine 28 as it is displayed on corresponding instrumentation to the pilot.

TABLE 1

| Percent | RPM | Frequency |
|---|---|---|
| 1 | 98.3 | 1.64 |
| 2 | 196.5 | 3.28 |
| 3 | 294.8 | 4.91 |
| 4 | 393.1 | 6.55 |
| 5 | 491.3 | 8.19 |
| 6 | 589.6 | 9.83 |
| 7 | 687.9 | 11.47 |
| 8 | 786.2 | 13.10 |
| 9 | 884.4 | 14.74 |
| 10 | 982.7 | 16.38 |
| 11 | 1081 | 18.02 |
| 12 | 1170.2 | 19.50 |
| 13 | 1277.5 | 21.29 |
| 14 | 1375.8 | 22.93 |
| 15 | 1474 | 24.57 |
| 16 | 1572.3 | 26.21 |
| 17 | 1670.6 | 27.84 |
| 18 | 1768.9 | 29.48 |
| 19 | 1867.1 | 31.12 |
| 20 | 1965.4 | 32.76 |
| 21 | 2063.7 | 34.40 |
| 22 | 2161.9 | 36.03 |
| 23 | 2260.2 | 37.67 |
| 24 | 2358.4 | 39.31 |
| 25 | 2456.7 | 40.95 |
| 26 | 2555 | 42.58 |
| 27 | 2653.3 | 44.22 |
| 28 | 2751.6 | 45.86 |
| 29 | 2849.8 | 47.50 |
| 30 | 2948.1 | 49.14 |
| 31 | 3046.4 | 50.77 |
| 32 | 3144.6 | 52.41 |
| 33 | 3242.9 | 54.05 |
| 34 | 3341.2 | 55.69 |
| 35 | 3439.4 | 57.32 |
| 36 | 3537.7 | 58.96 |
| 37 | 3636 | 60.60 |
| 38 | 3734.3 | 62.24 |
| 39 | 3832.5 | 63.88 |
| 40 | 3930.8 | 65.51 |
| 41 | 4029.1 | 67.15 |
| 42 | 4127.3 | 68.79 |
| 43 | 4225.6 | 70.43 |
| 44 | 4323.9 | 72.07 |
| 45 | 4422.1 | 73.70 |
| 46 | 4520.4 | 75.34 |
| 47 | 4618.7 | 76.98 |
| 48 | 4717 | 78.62 |
| 49 | 4815.2 | 80.25 |
| 50 | 4913.5 | 81.89 |
| 51 | 5011.8 | 83.53 |
| 52 | 5110 | 85.17 |
| 53 | 5208.3 | 86.81 |
| 54 | 5306.6 | 88.44 |
| 55 | 5404.8 | 90.08 |
| 56 | 5503.1 | 91.72 |
| 57 | 5601.4 | 93.36 |

TABLE 1-continued

| Percent | RPM | Frequency |
|---|---|---|
| 58 | 5699.7 | 95.00 |
| 59 | 5797.9 | 96.63 |
| 60 | 5896.2 | 98.27 |
| 61 | 5994.4 | 99.91 |
| 62 | 6092.7 | 101.55 |
| 63 | 6191 | 103.18 |
| 64 | 6289.3 | 104.82 |
| 65 | 6387.6 | 106.46 |
| 66 | 6485.8 | 108.10 |
| 67 | 6584.1 | 109.74 |
| 68 | 6682.4 | 111.37 |
| 69 | 6780.6 | 113.01 |
| 70 | 6878.9 | 114.65 |
| 71 | 6977.2 | 116.29 |
| 72 | 7075.4 | 117.92 |
| 73 | 7173.7 | 119.56 |
| 74 | 7272 | 121.20 |
| 75 | 7370.2 | 122.84 |
| 76 | 7468.5 | 124.48 |
| 77 | 7566.8 | 126.11 |
| 78 | 7665.1 | 127.75 |
| 79 | 7763.3 | 129.39 |
| 80 | 7861.6 | 131.03 |
| 81 | 7959.9 | 132.67 |
| 82 | 8058.1 | 134.30 |
| 83 | 8156.4 | 135.94 |
| 84 | 8254.7 | 137.58 |
| 85 | 8353 | 139.22 |
| 86 | 8451.2 | 140.85 |
| 87 | 8549.5 | 142.49 |
| 88 | 8647.8 | 144.13 |
| 89 | 8746 | 145.77 |
| 90 | 8844 | 147.40 |
| 91 | 8942.6 | 149.04 |
| 92 | 9040.8 | 150.68 |
| 93 | 9139.1 | 152.32 |
| 94 | 9237.4 | 153.96 |
| 95 | 9335.6 | 155.59 |
| 96 | 9433.9 | 157.23 |
| 97 | 9532.2 | 158.87 |
| 98 | 9630.4 | 160.51 |
| 99 | 9728.7 | 162.15 |
| 100 | 9827 | 163.78 |
| 101 | 9925.3 | 165.42 |
| 102 | 10023.5 | 167.06 |
| 103 | 10121.8 | 168.70 |
| 104 | 10220.1 | 170.34 |
| 105 | 10318.4 | 171.97 |
| 106 | 10416.6 | 173.61 |
| 107 | 10514.9 | 175.25 |
| 108 | 10613.2 | 176.89 |
| 109 | 10711.4 | 178.52 |
| 110 | 10809.7 | 180.16 |
| 111 | 10908 | 181.80 |
| 112 | 11006.2 | 183.44 |
| 113 | 11104.5 | 185.08 |
| 114 | 11202.8 | 186.71 |
| 115 | 11301.1 | 188.35 |
| 116 | 11399.3 | 189.99 |
| 117 | 11497.6 | 191.63 |
| 118 | 11595.9 | 193.27 |
| 119 | 11694.1 | 194.90 |
| 120 | 11792.4 | 196.54 |

TABLE 2

| Percent | RPM | Frequency |
|---|---|---|
| 1 | 34.3 | 0.57 |
| 2 | 68.7 | 1.15 |
| 3 | 103 | 1.72 |
| 4 | 137.3 | 2.29 |
| 5 | 171.6 | 2.86 |
| 6 | 206 | 3.43 |

TABLE 2-continued

| Percent | RPM | Frequency |
|---|---|---|
| 7 | 240.3 | 4.01 |
| 8 | 274.6 | 4.58 |
| 9 | 308.9 | 5.15 |
| 10 | 343.3 | 5.72 |
| 11 | 377.6 | 6.29 |
| 12 | 411.9 | 6.87 |
| 13 | 446.2 | 7.44 |
| 14 | 480.6 | 8.01 |
| 15 | 514.9 | 8.58 |
| 16 | 549.2 | 9.15 |
| 17 | 583.5 | 9.73 |
| 18 | 627.9 | 10.47 |
| 19 | 652.2 | 10.87 |
| 20 | 686.5 | 11.44 |
| 21 | 720.8 | 12.01 |
| 22 | 755.2 | 12.59 |
| 23 | 789.5 | 13.16 |
| 24 | 823.8 | 13.73 |
| 25 | 858.1 | 14.30 |
| 26 | 892.4 | 14.87 |
| 27 | 926.8 | 15.45 |
| 28 | 961.1 | 16.02 |
| 29 | 995.4 | 16.59 |
| 30 | 1029.8 | 17.16 |
| 31 | 1064.1 | 17.74 |
| 32 | 1098.4 | 18.31 |
| 33 | 1132.7 | 18.88 |
| 34 | 1167.1 | 19.45 |
| 35 | 1201.4 | 20.02 |
| 36 | 1235.7 | 20.60 |
| 37 | 1270 | 21.17 |
| 38 | 1304.4 | 21.74 |
| 39 | 1338.7 | 22.31 |
| 40 | 1373 | 22.88 |
| 41 | 1407.3 | 23.46 |
| 42 | 1441.7 | 24.03 |
| 43 | 1476 | 24.60 |
| 44 | 1510.3 | 25.17 |
| 45 | 1544.6 | 25.74 |
| 46 | 1579 | 26.32 |
| 47 | 1613.3 | 26.89 |
| 48 | 1647.6 | 27.46 |
| 49 | 1681.9 | 28.03 |
| 50 | 1716.3 | 28.61 |
| 51 | 1750.6 | 29.18 |
| 52 | 1784.9 | 29.75 |
| 53 | 1819.2 | 30.32 |
| 54 | 1853.6 | 30.89 |
| 55 | 1887.9 | 31.47 |
| 56 | 1922.2 | 32.04 |
| 57 | 1956.5 | 32.61 |
| 58 | 1990.9 | 33.18 |
| 59 | 2025.2 | 33.75 |
| 60 | 2059.5 | 34.33 |
| 61 | 2093.8 | 34.90 |
| 62 | 2128.2 | 35.47 |
| 63 | 2162.4 | 36.04 |
| 64 | 2196.8 | 36.61 |
| 65 | 2231.1 | 37.19 |
| 66 | 2265.4 | 37.76 |
| 67 | 2299.8 | 38.33 |
| 68 | 2334.1 | 38.90 |
| 69 | 2368.4 | 39.47 |
| 70 | 2402.8 | 40.05 |
| 71 | 2437.1 | 40.62 |
| 72 | 2471.4 | 41.19 |
| 73 | 2505.7 | 41.76 |
| 74 | 2540.1 | 42.34 |
| 75 | 2574.4 | 42.91 |
| 76 | 2608.7 | 43.48 |
| 77 | 2643 | 44.05 |
| 78 | 2677.4 | 44.62 |
| 79 | 2711.7 | 45.20 |
| 80 | 2746 | 45.77 |
| 81 | 2780.3 | 46.34 |
| 82 | 2814.7 | 46.91 |
| 83 | 2849 | 47.48 |

TABLE 2-continued

| Percent | RPM | Frequency |
|---|---|---|
| 84 | 2883.3 | 48.06 |
| 85 | 2917.6 | 48.63 |
| 86 | 2952 | 49.20 |
| 87 | 2986.3 | 49.77 |
| 88 | 3020.6 | 50.34 |
| 89 | 3054.9 | 50.92 |
| 90 | 3089.3 | 51.49 |
| 91 | 3123.6 | 52.06 |
| 92 | 3157.9 | 52.63 |
| 93 | 3192.2 | 53.20 |
| 94 | 3226.6 | 53.78 |
| 95 | 3260.9 | 54.35 |
| 96 | 3295.2 | 54.92 |
| 97 | 3329.5 | 55.49 |
| 98 | 3363.9 | 56.07 |
| 99 | 3398.2 | 56.64 |
| 100 | 3432.5 | 57.21 |
| 101 | 3466.8 | 57.78 |
| 102 | 3501.2 | 58.35 |
| 103 | 3535.4 | 58.92 |
| 104 | 3569.8 | 59.50 |
| 105 | 3604.1 | 60.07 |
| 106 | 3638.4 | 60.64 |
| 107 | 3672.8 | 61.21 |
| 108 | 3707.1 | 61.79 |
| 109 | 3741.4 | 62.36 |
| 110 | 3775.8 | 62.93 |
| 111 | 3810.1 | 63.50 |
| 112 | 3644.4 | 64.07 |
| 113 | 3878.7 | 64.65 |
| 114 | 3913.1 | 65.22 |
| 115 | 3947.4 | 65.79 |
| 116 | 3981.7 | 66.36 |
| 117 | 4016 | 66.93 |
| 118 | 4050.4 | 67.51 |
| 119 | 4084.7 | 68.08 |
| 120 | 4119 | 68.65 |
| 121 | 4153.3 | 69.22 |
| 122 | 4187.7 | 69.80 |
| 123 | 4222 | 70.37 |
| 124 | 4256.3 | 70.94 |
| 125 | 4290.6 | 71.51 |

Output of Accelerometers in Neuron Displacement

Figure 3:
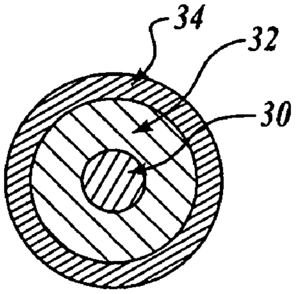
FIG. 3 illustrates outputs of accelerometers in neuron displacement.

FIG. 3 illustrates outputs of the system 10 in neuron displacement and what those outputs represent. When neurons are activated in a vector space 30 the engine 28 is operating satisfactorily. When measured vector displacement of the engine 28 is outside the vector space 30 into a vector space 32 then neurons in the vector space 32 are activated. This means that the engine 28 should be monitored. When a vector space 34 is encroached upon, then neurons in the vector space 34 are activated. This is an alert situation, meaning that action is desirable, such as fan balancing or removing the engine 28.

Accordingly, FIG. 3 thus represents the standard engine vibration output of the system 10. Processing of the outputs of the accelerometers 24 and 26 will now be explained with respect to engine conditions such as overspeed events, ice build-up, and excessive vibration.

Advantageously, the system 10 monitors for engine overspeed events. Because the system 10 is already monitoring fan speed, if an overspeed event were to occur, the system 10 advantageously monitors length and time of the event. As is known, engine overspeed events are rare and seldom occur. However, it is important with an engine overspeed event is to know the amount of time the event occurred. If the length of duration of the overspeed event is greater than a few seconds, a complete engine tear down and over haul may be entailed. This is due to the mass of the engine 28 as it expands outwardly as the engine 28 runs faster. This expansion can cause damage to the bearings and stress fractures in the engine 28.

Figure 4:
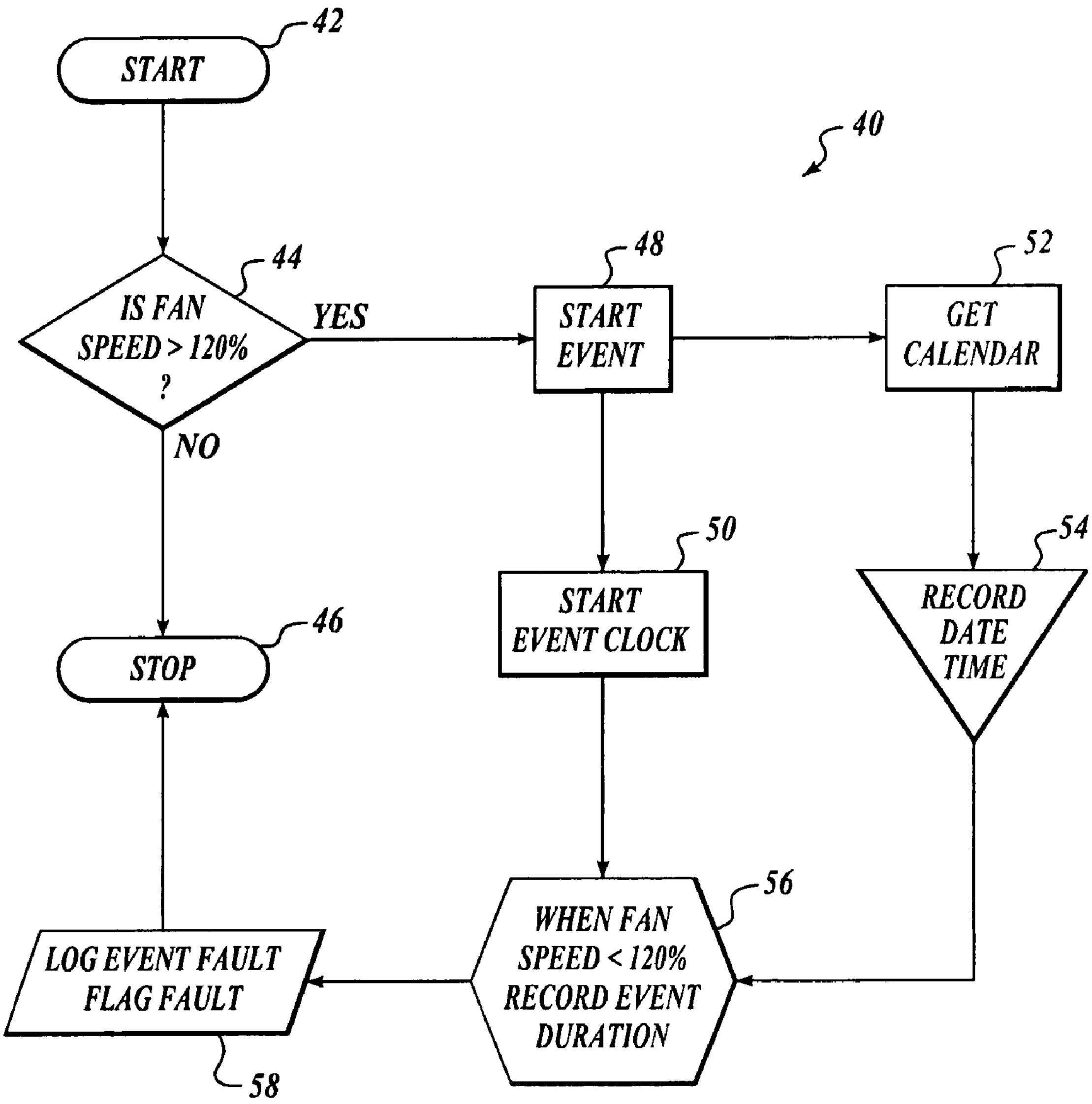
FIG. 4 is a flow chart of a routine engine over-speed event alerting and tracking.

Referring now to FIG. 4, in one exemplary embodiment, engine over-speed event alerting and tracking can be accomplished by a routine 40. The routine 40 starts at a block 42. At a decision block 44 a determination is made if fan speed N of the engine 28 is greater than an overspeed limit, such as around 120 percent. If not, then the routine 40 ends at a block 46. If so, then at a block 48 an overspeed event is started. At a block 50 an event clock is started. Suitably concurrently with the block 50, at a block 52 a suitable calendar is obtained and, at a block 54, date and time of the overspeed event is recorded. At a block 56, when the speed N of the engine 28 becomes less than the overspeed limit, such as around 120 percent, duration of the overspeed event is recorded. Maximum fan speed attained by the engine 28 is tracked. At a block 58 the event is logged and recorded in a suitable non-volatile memory for later retrieval and a fault is flagged, such as by being displayed by the display unit 22. The routine 40 ends at the block 46. From data gathered by the routine 40, engine managers can determine whether the engine 28 is operating satisfactorily, or should be inspected, or should be removed from the aircraft or other vehicle or facility in which the engine 28 is located.

Figure 5:
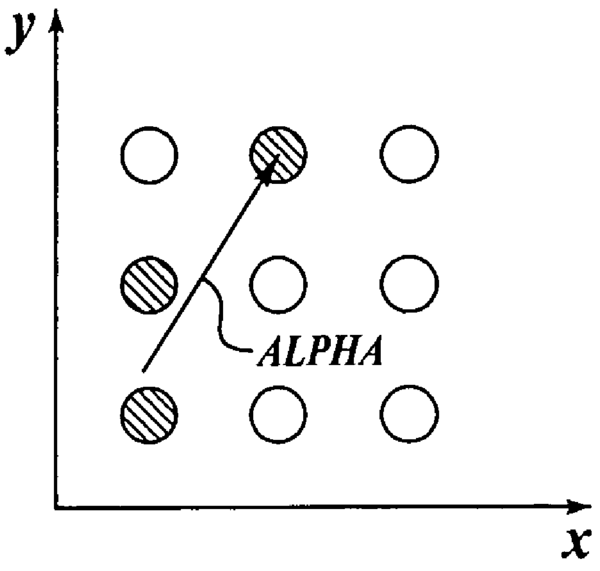
FIG. 5 illustrates neuron activity in a normal engine.

Neuron activity for various conditions will now be explained. Referring now to FIG. 5, neuron activity is illustrated for a normal engine. During normal engine cruise operations, a vector alpha activates neurons along its vector path. Vectors originate from the origin, which is the center radial axis of the engine 28. It is assumed that distance between each neuron is around 0.5 mils. In this example, the engine 28 is vibrating normally at approximately 1.5 mils.

The system 10 advantageously monitors for ice buildup on the fan section of the engine. Referring briefly back to FIGS. 2A and 2B, as ice builds on the fan of the engine 28, the ice acts to dampen the outputs of the accelerometer 24 along the X and Y axes of the accelerometer 24. This can only occur if the fan is traveling at a slow velocity relative to the normal fan cruise speed. Because the ice acts to dampen the outputs of the accelerometer 24, it is anticipated that the vector space of fan normal vibrations would decrease. Therefore, it follows that two conditions are to be satisfied for detecting ice build up on the fan. First, the engine 28 is operating at less than normal cruise speed. Second, the normal vibration pattern of the engine 28 is decreasing. As a result, the greater vibration that the engine 28 is experiencing, the more sensitive the system 10 is to detecting ice conditions on the fan.

Figure 6:
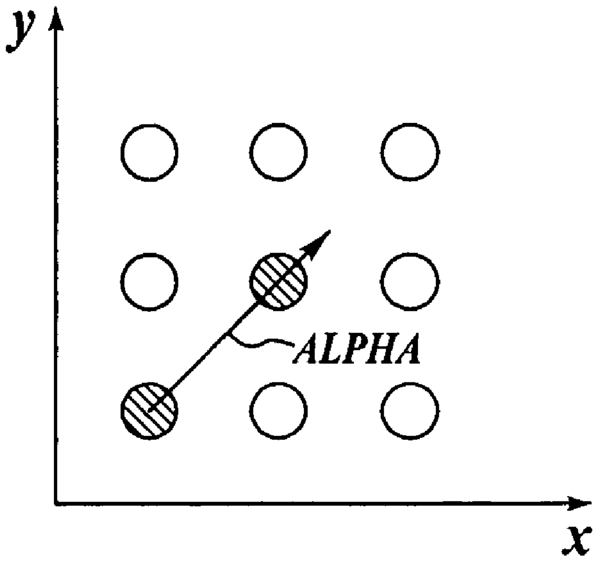
FIG. 6 illustrates neuron activity dampened with a slight corresponding phase shift.

Because normal engine vibration occurs at approximately 1.5 mils, reduction of vibration from ice build up causes a dampening effect of outputs of the accelerometer 24. FIG. 6 represents results on the fan with a dampening effect, such as that which may be caused by ice conditions. Because the ice build up dampens the accelerometer output, there is a corresponding, however slight, phase shift of the vector alpha. This phase shift, coupled with the dampening effect, activates a different set of neurons than the neurons activated in the normal engine 28 (FIG. 5). It will be appreciated that angular velocity of the engine 28 will not change during normal cruise and low fan speed operation. However, as ice builds up on the engine 28, the angular velocity will change, thereby causing a shift in neuron activity. It is this shift in neuron activity, coupled with the low fan speed, that will trigger an engine icing alert.

Exemplary System Details

Now that overviews of the system 10 and of the accelerometer outputs in neuron displacement have been set forth, details of an exemplary embodiment of the system 10 may now be explained.

Referring now to FIGS. 1, 2A, 2B, and 7 and according to one exemplary embodiment of the present invention, all signal processing suitably is accomplished by the neural network 12 that is mounted on the engine 28. The neural network 12 learns the normal operating characteristics of the particular engine 28 on which it is mounted. Advantageously, control software (described below) monitors the set space neurons and continuously compares outputs of the accelerometers 24 and 26 with the normal operating characteristics of the engine 28 to monitor engine health. In one embodiment, the outputs of the neural network 12 are presented to a transmitter 17, which transmits the outputs via the RF link 18 to a sensing antenna 19 in a protected environment, such as a fuselage of an aircraft. The transmitted signal is received by a receiver 21 and matched against a codebook of threshold values via a Linear Vector Quantisizer (LVQ) network for comparison to ensure that no spurious signals have been intercepted. In another embodiment, the outputs of the neural network 12 are provided to the interface unit 14 by the connection 16, such as electrical or optical connections. Once the signal is verified, it is then presented to an operating crew, such as a flight crew of an aircraft, via the command and control unit 20 for interpretation of the data. The command and control unit 20 analyzes vector patterns of the engine, provides information regarding engine overall health, makes recommendations regarding engine operation, and provides alert information regarding engine damage. Data is stored in a data memory device 36 for later retrieval, if required, for engine management purposes.

The Linear Vector Quantisizer (LVQ) is an exemplary neural network that is used to classify the vector outputs. The LVQ classifies the vector outputs into acceptable outputs and not acceptable outputs. An acceptable output is classified as one. An unacceptable output is classified as two.

Tables 3 and 4 represent exemplary codebooks of threshold values of acceptable and unacceptable vibration. The numbers in the left-most column and the bottom row of Tables 3 and 4 are values of measured vibration (in mils) that an engine is experiencing. Table 3 is constructed for the fan section 27 of the engine 28, which is allowed to have more vibration than the core 31. Table 4 is constructed for the core section 31 that has less allowable tolerance for engine vibration than the fan section 27.

TABLE 3

| | | | | | | | | |
|---|---|---|---|---|---|---|---|---|
| 3.5 | 2 | 2 | 2 | 2 | 2 | 2 | 2 | 2 |
| 3 | 2 | 2 | 2 | 2 | 2 | 2 | 2 | 2 |
| 2.5 | 1 | 1 | 1 | 1 | 1 | 1 | 2 | 2 |
| 2 | 1 | 1 | 1 | 1 | 1 | 1 | 2 | 2 |
| 1.5 | 1 | 1 | 1 | 1 | 1 | 1 | 2 | 2 |
| 1 | 1 | 1 | 1 | 1 | 1 | 1 | 2 | 2 |
| 0.5 | 1 | 1 | 1 | 1 | 1 | 1 | 2 | 2 |
| 0 | 1 | 1 | 1 | 1 | 1 | 1 | 2 | 2 |
| 0 | 0 | 0.5 | 1 | 1.5 | 2 | 2.5 | 3 | 3.5 |

TABLE 4

| | | | | | | | | |
|---|---|---|---|---|---|---|---|---|
| 3.5 | 2 | 2 | 2 | 2 | 2 | 2 | 2 | 2 |
| 3 | 2 | 2 | 2 | 2 | 2 | 2 | 2 | 2 |
| 2.5 | 2 | 2 | 2 | 2 | 2 | 2 | 2 | 2 |
| 2 | 2 | 2 | 2 | 2 | 2 | 2 | 2 | 2 |
| 1.5 | 1 | 1 | 1 | 1 | 2 | 2 | 2 | 2 |
| 1 | 1 | 1 | 1 | 1 | 2 | 2 | 2 | 2 |
| 0.5 | 1 | 1 | 1 | 1 | 2 | 2 | 2 | 2 |
| 0 | 1 | 1 | 1 | 1 | 2 | 2 | 2 | 2 |
| 0 | 0 | 0.5 | 1 | 1.5 | 2 | 2.5 | 3 | 3.5 |

Signal processing performed by the neural network 12 is explained below with further reference to FIG. 7. Transducer outputs 100 represent the force of the engine vibration (in mils) sensed by the accelerometers 24 and 26. The period in seconds is the inverse of the frequency of the fan. This information is taken from Table 2 where the frequency of operation is noted as 60 Hertz, or 105% N1. The pulse width is the width of the pulse of the vibration in percentage of the length of the signal. The phase delay is the amount of delay, which can range from 0 to 0.01666667 (>0 (x or y)<0.01666667). This is due to the frequency of operation of the fan.

Fan speed output 102 of the fan speed sensor on the aircraft is a sine wave, the amplitude of which on the aircraft is manipulated to an amplitude of 1. In one embodiment, the output is a constant value of one. Table 5 lists fan speed N1 and sampling rate. It will be appreciated that the frequency is not a constant but instead may vary over a broad range. The sample time sets the samples per frame in one exemplary embodiment at 1000 samples per frame. Similarly, Table 6 lists core speed N2 and sampling rate.

TABLE 5

Theta = omega*t

| Cos Terms | | Harmonics | Sin Terms | | Harmonics |
|---|---|---|---|---|---|
| 25740 | 1 | 71.5 | 25740 | 1 | 71.5 |
| 51480 | 2 | 143 | 51480 | 2 | 143 |
| 77220 | 3 | 214.5 | 77220 | 3 | 214.5 |

Interval (t) = 3.885E−05 — Nyqusit Sampling Rate = 1.9425E−05; Rate per Second = 51480

| Omega | Theta | t | Sin (2 pft) | Cos (2 pft) | sin(h) + cos(v) |
|---|---|---|---|---|---|
| 0 | 360 | 0 | 0 | 1 | 1 |
| 15 | 360 | 0.000582751 | 0.25881905 | 0.96592583 | 1.224744871 |
| 30 | 360 | 0.001165501 | 0.5 | 0.8660254 | 1.366025404 |
| 45 | 360 | 0.001748252 | 0.70710678 | 0.70710678 | 1.414213562 |
| 60 | 360 | 0.002331002 | 0.8660254 | 0.5 | 1.366025404 |
| 75 | 360 | 0.002913753 | 0.96592583 | 0.25881905 | 1.224744871 |
| 90 | 360 | 0.003496503 | 1 | 6.1257E−17 | 1 |
| 105 | 360 | 0.004079254 | 0.96592583 | −0.25881905 | 0.707106781 |
| 120 | 360 | 0.004662005 | 0.8660254 | −0.5 | 0.366025404 |
| 135 | 360 | 0.005244755 | 0.70710678 | −0.70710678 | 0 |
| 150 | 360 | 0.005827506 | 0.5 | −0.8660254 | −0.366025404 |
| 165 | 360 | 0.006410256 | 0.25881905 | −0.96592583 | −0.707106781 |
| 180 | 360 | 0.006993007 | 1.2251E−16 | −1 | −1 |
| 195 | 360 | 0.007575758 | −0.25881905 | −0.96592583 | −1.224744871 |
| 210 | 360 | 0.008158508 | −0.5 | −0.8660254 | −1.366025404 |
| 225 | 360 | 0.008741259 | −0.70710678 | −0.70710678 | −1.414213562 |
| 240 | 360 | 0.009324009 | −0.8660254 | −0.5 | −1.366025404 |
| 255 | 360 | 0.00990676 | 0.96592583 | 0.25881905 | 1.224744871 |
| 270 | 360 | 0.01048951 | −1 | −1.8377E−16 | −1 |
| 275 | 360 | 0.010683761 | −0.9961947 | 0.08715574 | −0.909038955 |
| 300 | 360 | 0.011655012 | −0.8660254 | 0.5 | −0.366025404 |
| 315 | 360 | 0.012237762 | −0.70710678 | 0.70710678 | 0 |
| 330 | 360 | 0.012820513 | −0.5 | 0.8660254 | 0.366025404 |
| 345 | 360 | 0.013403263 | −0.25881905 | 0.96592583 | 0.707106781 |
| 360 | 360 | 0.013986014 | −2.4503E−16 | 1 | 1 |

TABLE 6

| Max Speed | Core | | f Hz | | T |
|---|---|---|---|---|---|
| | 120 | | | | 0.00508 |
| % | | N2 | 196.53 | 82 | |
| | 1179 | | Omega | | |
| 2 | | RPM = 2(pi)f | | | |

Theta = omega*t

| Cos Terms | | Harmonics | Sin Terms | | Harmonics |
|---|---|---|---|---|---|
| 70752 | 1 | 196.53 | 70752 | 1 | 196.53 |
| 141504 | 2 | 393.07 | 141504 | 2 | 393.07 |
| 212256 | 3 | 589.60 | 212256 | 3 | 589.60 |

Interval (t) = 1.4134E−05 — Nyqusit Sampling Rate = 7.06694E−06; Rate per Second = 141504

| Omega | Theta | t | Sin (2 pft) | Cos (2 pft) | sin(h) + cos(v) |
|---|---|---|---|---|---|
| 0 | 360 | 0 | 0 | 1 | 1 |
| 15 | 360 | 0.000212008 | 0.25881905 | 0.96592583 | 1.224744871 |

TABLE 6-continued

| | | | | | |
|---|---|---|---|---|---|
| 30 | 360 | 0.000424016 | 0.5 | 0.8660254 | 1.366025404 |
| 45 | 360 | 0.000636024 | 0.70710678 | 0.70710678 | 1.414213562 |
| 60 | 360 | 0.000848033 | 0.8660254 | 0.5 | 1.366025404 |
| 75 | 360 | 0.001060041 | 0.96592583 | 0.25881905 | 1.224744871 |
| 90 | 360 | 0.001272049 | 1 | 6.1257E−17 | 1 |
| 105 | 360 | 0.001484057 | 0.96592583 | −0.25881905 | 0.707106781 |
| 120 | 360 | 0.001696065 | 0.8660254 | −0.5 | −0.366025404 |
| 135 | 360 | 0.001908073 | 0.70710678 | 0.70710678 | 0 |
| 150 | 360 | 0.002120081 | 0.5 | −0.8660254 | −0.366025404 |
| 165 | 360 | 0.00233209 | 0.25881905 | −0.96592583 | −0.707106781 |
| 180 | 360 | 0.002544098 | 1.2251E−16 | −1 | −1 |
| 195 | 360 | 0.002756106 | −0.25881905 | −0.96592583 | −1.224744871 |
| 210 | 360 | 0.002968114 | −0.5 | −0.8660254 | −1.366025404 |
| 225 | 360 | 0.003180122 | −0.70710678 | −0.70710678 | −1.414213562 |
| 240 | 360 | 0.00339213 | −0.8660254 | −0.5 | −1.366025404 |
| 255 | 360 | 0.003604138 | −0.96592583 | −0.25881905 | −1.224744871 |
| 270 | 360 | 0.003816147 | −1 | −1.8377E−16 | −1 |
| 275 | 360 | 0.003886816 | −0.9961947 | 0.08715574 | −0.909038955 |
| 300 | 360 | 0.004240163 | −0.8660254 | 0.5 | −0.366025404 |
| 315 | 360 | 0.004452171 | −0.70710678 | 0.70710678 | −1.55431E−15 |
| 330 | 360 | 0.004664179 | −0.5 | 0.8660254 | 0.366025404 |
| 345 | 360 | 0.004876187 | −0.25881905 | 0.96592583 | 0.707106781 |
| 360 | 360 | 0.005088195 | −2.4503E−16 | 1 | 1 |

A product 104 is an element-by-element multiplication of the outputs of the fan speed 102 and the transducer 100.

$$S_{hat}x(t)=x(t)\cos 2\pi f_c t \quad (3.0)$$

$$S_{hat}y(t)=y(t)\sin 2\pi f_c t \quad (3.1)$$

XY Graph1 106 is the plot of the output of the transducers from equations (3.0) and (3.1):

$$S_{hat}(t)=x(t)\cos 2\pi f_c t+y(t)\sin 2\pi f_c t \quad (3.2)$$

Figure 8:
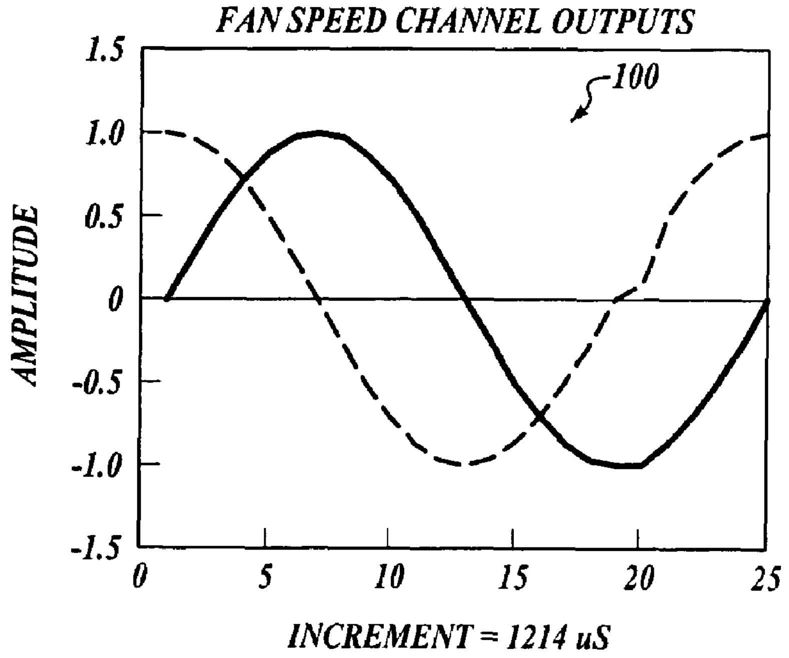
FIG. 8 graphs fan speed channel outputs.
Figure 9:
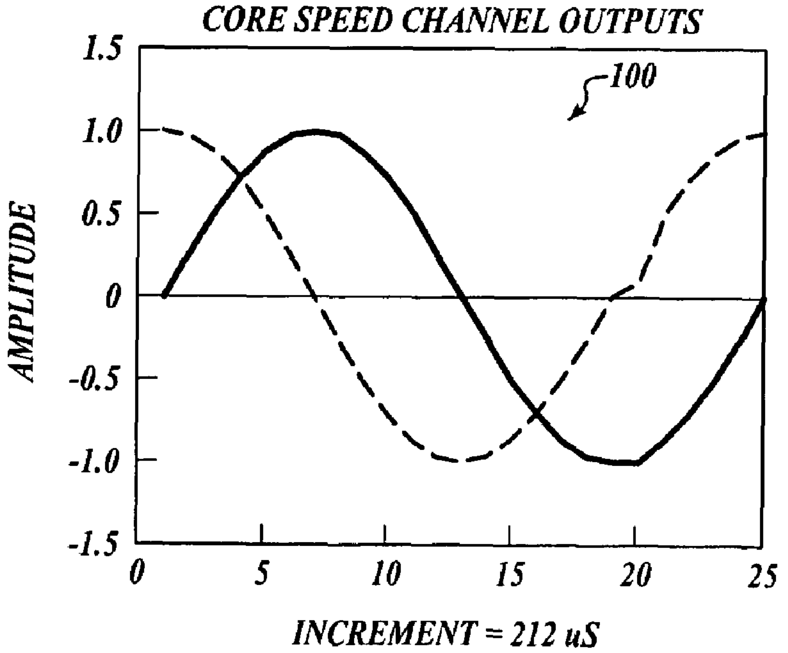
FIG. 9 graphs core speed channel outputs.

Zero order hold 108 sets the sample rate based on angular velocity omega of the engine. In one embodiment, the Nyquist sampling rate for the fan speed N1 is set at 19.43 milliseconds or 51,480 times per second. The Nyquist sampling rate for the core engine speed N2 is set at 7.07 milliseconds or 141,504 times per second. The reason for the differences in the sample times is that the engine core speed N2 is much faster than the fan speed N1. FIGS. 8 and 9 illustrate the output 100 of the fan and core speed sensors 24 and 26, respectively, broken into sine and cosine for the individual channels and then plotted against one another. This is the output that is multiplied by the output of the transducers for the X and Y Channels.

As is known, engine channels are very noisy. This is a primary cause of present engine indication systems offering false alerts to flight crews. To enhance confidence in information regarding engine vibration, a noise eliminator 110 is provided for each channel of the system 10. The purpose of the noise eliminator 110 is to introduce noise into the system 10 and then identify the noise and subtract, or remove, this noise from the system 10. The noise eliminators 110 are utilized in both the X and Y Channels. The function of the noise eliminators 110 is to take the place of the fan tracking filters that are used in currently known engine vibration monitoring systems.

Figure 7:
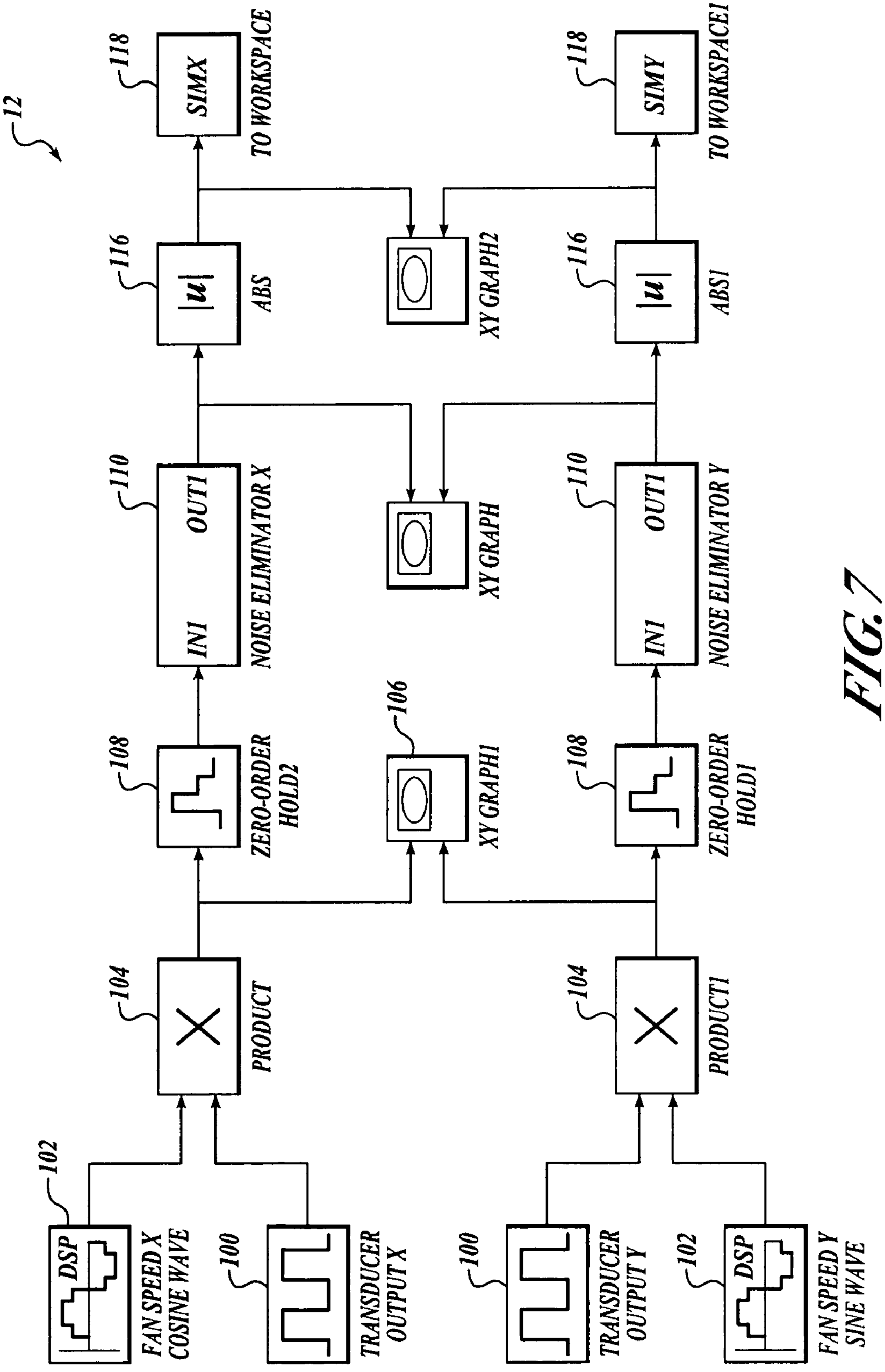
FIG. 7 is a block diagram of an engine section monitor.
Figure 10:
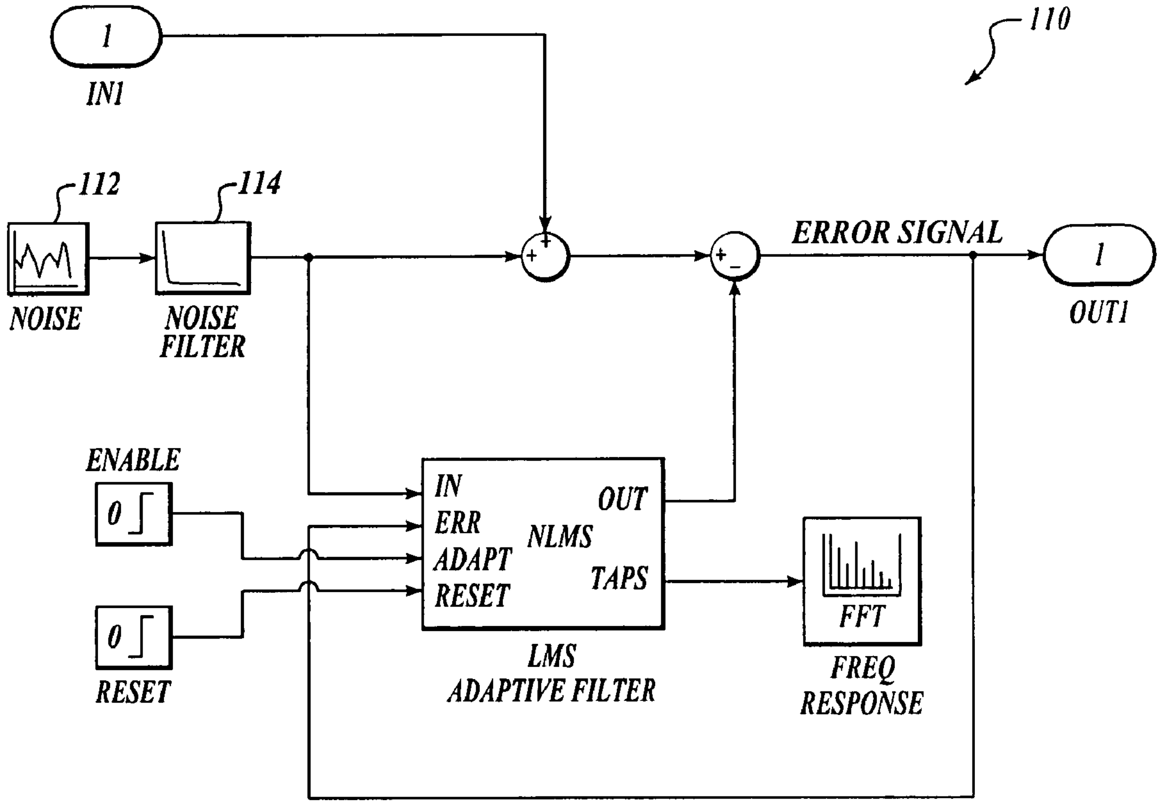
FIG. 10 is a block diagram of noise eliminators.

Referring now to FIGS. 7 and 10, details will be set forth regarding the noise eliminators 110. A random noise generator block 112 is set at Gaussian with a mean of 0 and a variance of 0.01. This random noise is passed through a filter 114 with an impulse response. The filter 114 suitably is a Hamming filter set for a band pass with an upper frequency cutoff of 280 Hz and a lower frequency cutoff of 30 Hz. The upper and lower frequencies approximate the operating frequencies of the engine. The filter impulse response (FIR) for the fan section 27 of the engine 28 is between around 30 Hz to around 70 Hz. The FIR correlates white noise patterns to the operating frequency of the engine 28. For the fan section 27, the lower cutoff frequency is the operating frequency of the fan section 27. This is because 30 Hz correlates to around 50 percent of the operating power of the engine 28—below which the engine 28 need not be monitored. Idle power is generally around 40 percent of engine tachometer and normal cruise is generally around 85 percent of engine tachometer. The signal s(t) from the zero-order hold 108 is then contaminated with the signal of the filtered random noise from the filter 114. If c(t) equals the contaminated noise and m(t) equals the sum of the signal:

$$C(t)=s(t)_x+m(t)_x \quad (3.3)$$

$$C(t)_y=s(t)_y+m(t)_y \quad (3.4)$$

The Least Mean Square algorithm is described as:

$$W(n+1)=W(n)+u(n)e(n)X(n) \quad (3.5)$$

$$E(n)=d(n)-W^T(n)X(n) \quad (3.6)$$

where W(n) is the coefficient vector, X(n) is the signal input vector, d(n) is the desired signal, e(n) is the error signal, u(n) is the step size.

$$C(n)_x=C(nT_s)_x \quad (3.7)$$

$$C(n)_y=C(nT_s)_y \quad (3.8)$$

The Least Mean Square Algorithm for the system is then:

$$W(n+1)=W(n)+u(n)e(n)C(n)_x \quad (3.9)$$

$$W(n+1)=W(n)+u(n)e(n)C(n)_y \quad (3.10)$$

$$E(n)_x=d(n)_x-W^T(n)C(n)_x \quad (3.11)$$

$$E(n)_y=d(n)_y-W^T(n)C(n)_y \quad (3.12)$$

$$D(n)_x=W^TC(n)_x+n(n) \quad (3.13)$$

$$D(n)_y=W^TC(n)_y+n(n) \quad (3.14)$$

The coefficient vector error is defined as:

$$V(n)=W(n)-W_{opt} \quad (3.15)$$

Rewriting the algorithms in terms of the coefficient vector error.

$$V(n+1)_x=V(n)-u(n)C(n)_x C^T(n)_x V(n)+u(n)n(n)C(n)_x \quad (3.16)$$

$$V(n+1)_y=V(n)-u(n)C(n)_y C^T(n)_y V(n)+u(n)n(n)C(n)_y \quad (3.17)$$

Taking the expectations of both sides yields:

$$E[V(n+1)_x]=E[V(n)-u(n)E[C(n)_x C^T(n)_x V(n)]+u(n)E[n(n)C(n)] \quad (3.18)$$

$$E[V(n+1)_y]=E[V(n)-u(n)E[C(n)_y C^T(n)_y V(n)]+u(n)E[n(n)C(n)_y](3.19)$$

Since $E[C(n)_x C^T(n)_x V(n)]$ approximates $E[C(n)_x C^T(n)_x]E[V(n)]$ (3.20)

and $E[C(n)_y C^T(n)_y V(n)]$ approximates $E[C(n)_y C^T(n)_y]E[V(n)]$ (3.21)

$$=R_{xx}E[V(n)] \quad (3.22)$$

$$=R_{yy}E[V(n)] \quad (3.23)$$

Combining the results with (3.18) and (3.19) yields:

$$E[V(n+1)_x=(I-u(n)R_{xx})E[V(n)] \quad (3.24)$$

$$E[V(n+1)_y=(I-u(n)R_{yy})E[V(n)] \quad (3.25)$$

$$E[V(n)_x]=(I-uR_{xx})^n E[V(0)_x] \quad (3.26)$$

$$E[V(n)_y]=(I-uR_{yy})^n E[V(0)_y] \quad (3.27)$$

The eigenvalue decomposition of the matrix $R_{xx}$ and $R_{yy}$ is then:

$$R_{xx}=Q(\text{LAMBDA})Q^T \quad (3.28)$$

$$R_{yy}=Q(\text{LAMBDA})Q^T \quad (3.29)$$

$$E[w_i(n)]=w_{i,opt}+(\text{sum of})_{j=0}^{for\ L-1} qij(1-u(\text{lambda})_j^n E[v\sim_j(0)] \quad (3.30)$$

where $q_{ij}$ is th (I+1, j+1) element of the eigenvector matrix Q and $v\sim_j(n)$ is the (j+1) of the coefficient error vector defined as:

$$V\sim(n)_x=Q^T V(n)_x \quad (3.31)$$

$$V\sim(n)_y=Q^T V(n)_y \quad (3.31)$$

The output of the noise eliminators 110 can then be described as:

$$X\sim(n)=C(n)_x-V\sim(n)_x \quad (3.32)$$

$$Y\sim(n)=C(n)_y-V\sim(n)_y \quad (3.33)$$

Where X~(n)+Y~(n)=the vector outputs of the system.

Referring back to FIG. 7, absolute values 116 of the vectors X~(n) and Y~(n) are taken to simplify the processing. The outputs of the scalars for the model then are defined as:

$$X(n)=ABS[X\sim(n)] \quad (3.34)$$

$$Y(n)=ABS[Y\sim(n)] \quad (3.35)$$

Because neural networks use vectors, utilization of Fourier Transforms is a slower process than utilization of the Hilbert Transform. This is because converting from the frequency domain to the time domain entails intensive calculations. In the frequency domain, a vector is made up of components of the complex wave form. Thus, to properly determine the vector output, all the simple components of the complex wave form are calculated first. Then, the individual components of the vector are summed to assemble the vector. Instead, the Hilbert Transform advantageously provides correlation of the engine displacement as a direct vector. In one embodiment, the output of the Hilbert Transform is to matrices SIM X and SIM Y. Simout 118 for the X and Y channels are the output arrays. The variables are two arrays of eigenvalues that are each 49 characters in length. From the two variables, matrices can be formed to create the vector representations.

Software

Figure 11:
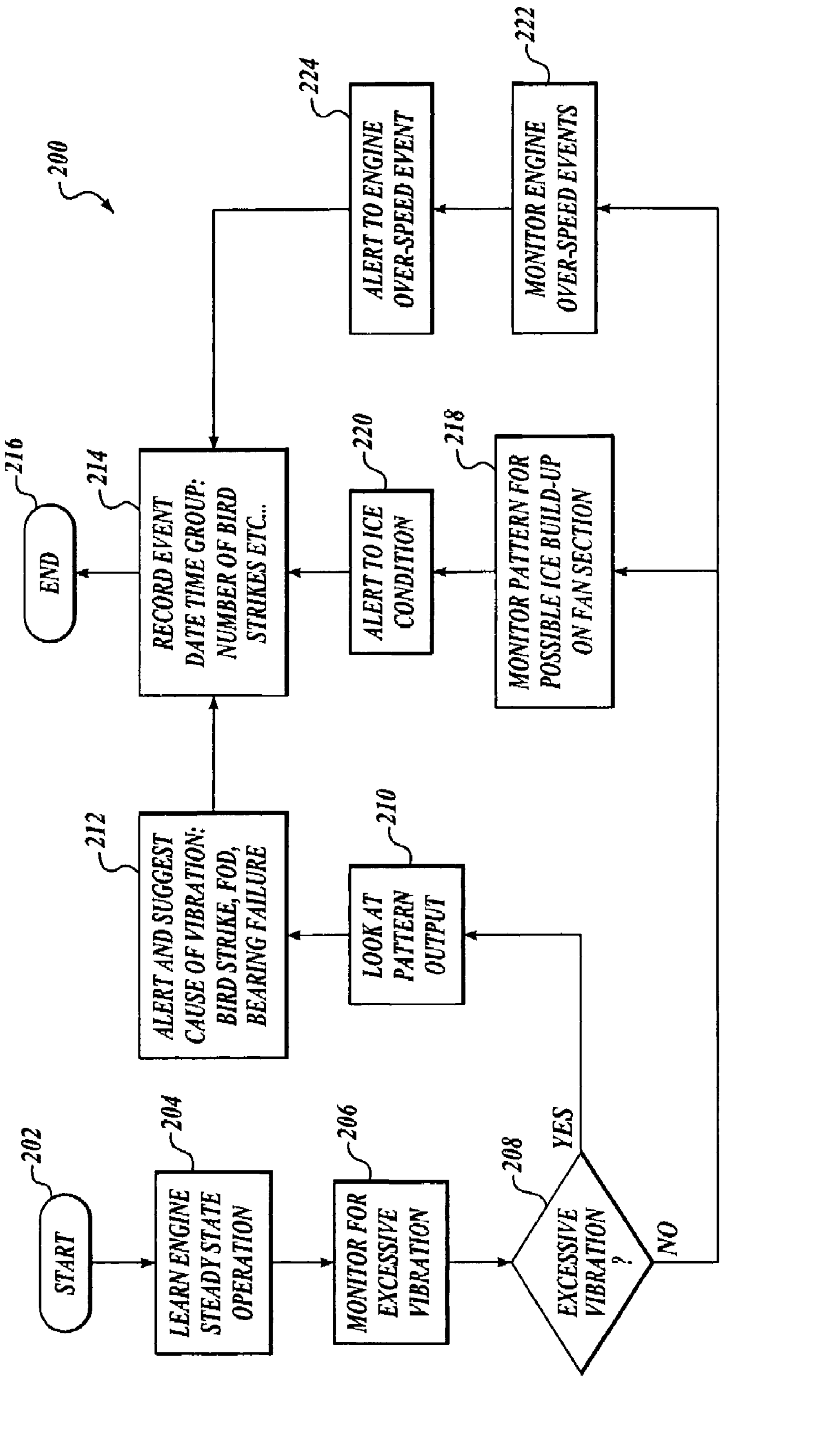
FIG. 11 is a flow chart of a routine performed according to an embodiment of the present invention.

Referring now to FIG. 11, a software routine 200 is performed by each neural network 12 to monitor its associated engine 28 according to an exemplary embodiment of the present invention. The routine 200 starts at a block 202. At a block 204 steady state operation is learned. At a block 206 the engine 28 is monitored for excessive vibration. At a decision block 208 a determination is made whether vibration is excessive.

If at the decision block 208 it is determined that vibration is excessive, then at a block 210 a pattern of neuron outputs from the neural network 12 is analyzed. At a block 212, an alert is generated along with a suggested cause of the excessive vibration event, such as for example bird strike, foreign object damage, or bearing failure. At a block 214 a date and time of the excessive vibration event is recorded and a running tally of the number of the type of events is updated and maintained. The routine 200 ends at a block 216.

If at the decision block 208 it is determined the vibration is not excessive, then at a block 218 the pattern of neuron outputs is monitored for possible ice build-up on the fan section of the engine 28. At a block 220 an alert is generated regarding the ice condition. At the block 214, a date and time of the ice condition is recorded and a running tally of the number of ice condition events is updated and maintained. The routine 200 ends at the block 216.

If at the decision block 208 it is determined that vibration is not excessive, then at a block 222 the pattern of neuron outputs is monitored for an overspeed condition. At a block 224 an alert is generated regarding the overspeed condition. At the block 214 a date, time, and duration of the overspeed condition is recorded and a running tally of the number of overspeed condition events is updated and maintained. The routine 200 ends at the block 216.

An exemplary embodiment of a computer software program that performs the routine 200 includes two modules. The first module is a training module to train the system 10 on what inputs and outputs are acceptable and to learn the set space neuron map of the engine. Each neuron is scaled to the neuron set space to closely match the output vector of the system. The second module is operational software that monitors the engine 28 and makes determination regarding excessive vibration, overspeed events, and the like.

Exemplary training software will be explained first. Given by way of non-limiting example, Trainconsimxy.m is exemplary training software, that is the first module, for the system 10. A Neural Network Tool-box suitably is used to establish the training set. The variables px, py, p and icet are used to train the system. In this training set a Learning Vector Quantization (LVQ) with a 2-neuron network was chosen to train. The LVQ network is trained to classify engine vibrations into two separate types of vectors: vectors that are acceptable and vectors that are not acceptable. Acceptable vibrations are classified as 1 and unacceptable are classified as 2.

```
% Set values of Sim to matrix form.
px=0,py=0,p=0,icet=0;
px=[1 2 3 4 5 6];
```

```
py=[1 2 3 4 5 6];
p=[px;
py];
net = newc([0 6; 0 6],2);
wts = net.IW{1,1}
net.trainParam.epochs =1000
net = train(net,p);
a = sim(net,p)
ac = vec2ind(a)
```

The variables px and py are the scalars of vectors from 1 to 6. The variable p is the vector space. In this training set net is told to utilize a new competitive network where the input scalars are in the range from 1 to 6 and use two neurons to classify these scalars. It is to have 1000 training epochs to train the network. The variable a then is the net of the neurons and ac is the classification of the neural net.

The training set for the set space neurons is shown in Appendix A. The purpose of the set space neurons is three-fold. The first is to illustrate the concept of the engine vibration system; the second is to illustrate the how the code book for the system will be constructed; and the third is that each set of neurons activated a cognitive memory may be associated with it.

Exemplary operational software will now be explained. Given by way of non-limiting example, Icesimxy.m is exemplary operational software, that is the second module, that determines whether the engine has excessive vibration, determines the steady state operation of the engine, and determines if the engine is in an icing condition. The py is the output for the values of simouty and px is the output for the values of simoutx and p is the vector space:

```
% Set values of Sim to matrix form.
px=0,py=0,p=0
for i = 1:49
py(:,i)=simy(:,:,i);
end
for i=1:49
px(:,i)=simx(:,:,i);
end
p=[px;
py];
```

The value of p then is the matrix $p_{x,y}$, where p is a (2×49) matrix representing the vector space of the model.

Before the system 10 learns the engine steady state operation the system 10 first checks for excessive vibration of the engine 28. Excessive vibration is determined by presenting the data to the trained LVQ neural network. Advantageously, the system 10 does not learn the operating parameters of an engine that is determined to be operating out of limits.

```
% Engine Vibration Monitor: Check Engine For Excessive Vibration
ice = 0
a = sim(net,p);
ac = vec2ind(a);
for i = 1:49
count = ac(:,i);
if count == 2
   ice = 1
   plot(px,py)
   title('Alert Vibration')
end
end
```

The variable ice is the flag variable assigned to the output of the excessive engine vibration monitor. The LVQ network classifies the vector space of the variable p. Here, count is the classification of the LVQ network. If the LVQ network classifies the vibration as unacceptable (2), then the flag variable ice is set to 1. The output of the system is plotted on an 'Alert Vibration' table. If not, then ice remains 0 to check for the next high vibration event.

The engine steady state operation is determined by assigning the set space vector output to a set space neuron. Each neuron is scaled in the set space to a value of 0.5 mils of vibration, the formula for which is defined as:

```
% Establish Engine Steady State Operation
% Establish Engine Matrix Neuron Set
if icet == 0
icetx = 0, icety = 0;
for i = 1:49
   if px(:,i)< 0.1
      icetx(:,i) = 0;
   elseif px(:,i) <= 0.5
      icetx(:,i) = 1;
   elseif px(:,i) <= 1
      icetx(:,i) = 2;
   elseif px(:,i) <= 1.5
      icetx(:,i)= 3;
   elseif px(:,i) <= 2
      icetx(:,i) = 4;
   elseif px(:,i) <= 2.5
      icetx(:,i) = 5;
   elseif px(:,i) <= 3
      icetx(:,i) = 6;
   else
      icetx(:,i) = 7;
   end
   if py(:,i) < 0.1
      icety(:,i) = 0;
   elseif py(:,i) <= 0.5
      icety(:,i) = 1;
   elseif py(:,i) <= 1
      icety(:,i) =2;
   elseif py(:,i) <= 1.5
      icety(:,i) = 3;
   elseif py(:,i) <= 2
      icety(:,i) = 4;
   elseif py(:,i) <= 2.5
      icety(:,i) = 5;
   elseif py(:,i) <= 3
      icety(:,i) = 6;
   else
      icety(:,i) = 7;
   end
end
icet = 1;
end
Engineset=[icetx icety];
% Visual plot of neuron activation
figure
hold on
plotsom(pmapxy)
for i = 1:49
plot(icetx(:,i),icety(:,i),'b*')
end
```

The variable icet is the training flag captured from the training program. If icet is set at zero, then the system 10 learns the steady state engine operation and remembers this. This is the baseline for monitoring engine operation. Should the engine stray from this baseline then the pilot has a measure of monitoring the amount of change in the engine and has a very good idea of the status of the engine health. The variables icetx and icety are the neuron activation scalars in the neuron vector activation set space of Engineset. The neuron set space is then plotted and the activated neurons are displayed representing the engine steady state operation.

The ice monitoring and bird strike detection is the extension of the engine steady state operation. Ice formation occurs at low fan speeds. There are several variables involved in the formation of ice build up on a rotating fan. The variables governing the build up on a reciprocating fan can be found in Boyle's Law. Simply stated, the pressure and temperature of the atmosphere forward of the fan section determines if and when the build up will occur. Factors such as the size of the fan, the shape of the engine spinner, the temperature, speed, and pressure in which the engine is operating result in the phenomena. Because the phenomena occurs on different engines under varying circumstances, the speed monitoring for such an event is unknown without testing the engine, or to have access to the engine manufacturer test data.

Some assumptions can be made for determining ice build up on the engine and determining if the engine has suffered a bird strike. The assumption is that ice build up will occur evenly across the fan section face and that ice build up will occur uniformly acting as a vibration-dampening agent. This causes the engine to run better for vibration monitoring purposes. Bird strikes on the other hand cause engines to vibrate more abruptly. Either change in the engine steady state operation will cause an alert event giving the pilot an indication that there is ice build up on the fan section by a decrease in the activated neuron set space; alternately, an increase in the neuron set space means that a bird has been struck. An exemplary formula for ice monitoring is the following:

```
% Engine Ice Monitoring
% Engine Ice Monitoring Occurs at Slow Fan Speeds
if ice == 0
icecreamx=0;,icecreamy=0;
for i = 1:49
  if px(:,i) < 0.1
    icecreamx(:,i) = 0;
  elseifpx(:,i) <= 0.5
    icecreamx(:,i) = 1;
  elseif px(:,i) <= 1
    icecreamx(:,i) = 2;
  elseif px(:,i) <= 1.5
    icecreamx(:,i) = 3;
  elseif px(:,i) <= 2
    icecreamx(:,i) = 4;
  elseif px(:,i) <= 2.5
    icecreamx(:,i) = 5;
  elseif px(:,i) <= 3
    icecreamx(:,i) = 6;
  else
    icecreamx(:,i) = 7;
  end
  if py(:,i) < 0.1
    icecreamy(:,i) = 0;
  elseif py(:,i) <= 0.5
    icecreamy(:,i) = 1;
  elseif py(:,i) <= 1
    icecreamy(:,i) = 2;
  elseif py(:,i) <= 1.5
    icecreamy(:,i) = 3;
  elseif py(:,i) <= 2
    icecreamy(:,i) = 4;
  elseif py(:,i) <= 2.5
    icecreamy(:,i) = 5;
  elseif py(:,i) <= 3
    icecreamy(:,i) = 6;
  else
    icecreamy(:,i) = 7;
  end
end
end
Icecream=[icecreamx icecreamy];
for i = 1:49
  if Engineset(:,i)~=Icecream(:,i)
    title('ALERT')
    plot(icecreamx(:,i),icecreamy(:,i),'g*')
  end
end
```

If ice == 0 (the engine is not vibrating excessively), then the engine should be checked for abnormal operation. This is accomplished by creating another set space neuron map and comparing the engine steady state operation neuron map against the newly created map. The variables Icecream x and icecream y are the scalars that reside within the vector space Icecream.

Neuron Set Spaces

Now that an exemplary software embodiment has been explained, neuron set spaces and neuron activation for normal operation of the engine 28 and for excessive vibration or overspeed conditions are explained below.

Figure 12:
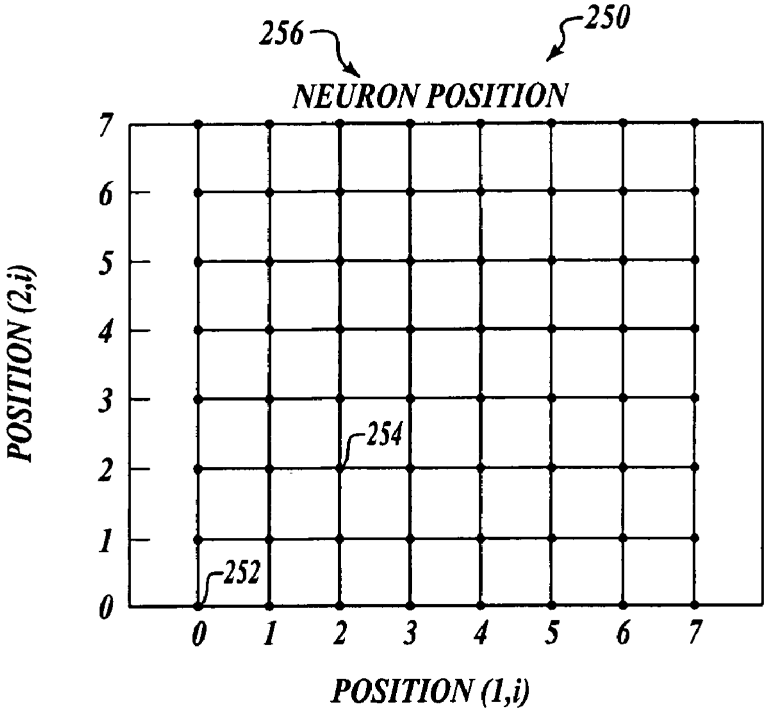
FIG. 12 is a neuron set space map.

Referring now to FIG. 12, a normally operating engine yields a neuron set space map 250. Activated Neuron Sets 252 and 254 appear at (0,0) and (2,2). This is an example of a normally operational engine, where the engine is vibrating about 1 mil. In one embodiment, the set space map 250 is displayed on the display unit 22 (FIG. 1). The neuron sets 252 and 254 may be displayed in such a manner as to connote a normal operating condition. Given by way of non-limiting example, the neuron sets may be displayed on the display unit in blue. However, other colors (or any shape) may be selected as desired. The set space map 250 may have a title 256, if desired, such as "Neuron Positions".

Figure 13:
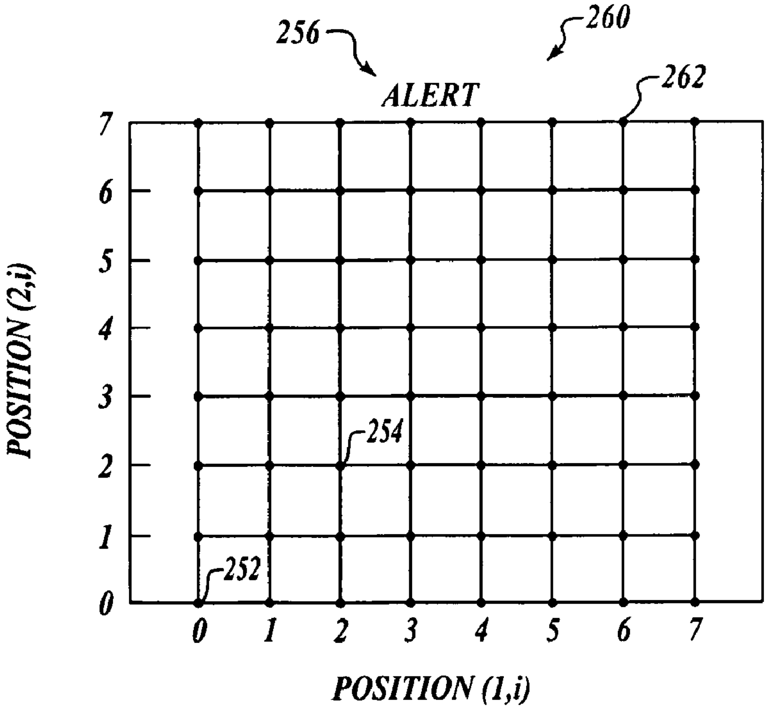
FIG. 13 is an alert excessive vibration neuron set space map.

Referring now to FIG. 13, an engine experiencing excessive vibration yields a neuron set space 260. The neuron sets 252 and 254 are activated (as discussed in connection with FIG. 12) when the engine is operating normally. When the engine experiences excessive vibration, the neuron set 252 and a neuron set 262 at (6,7) are activated. The neuron set 254 is no longer activated. The title 256 has changed to reflect a changed condition. As such, the title 256 may indicate "Alert" or the like, as desired. Further, the appearance of the neuron sets 252 and 262 may change to indicate a change in engine health. For example, color of the neuron sets 252 and 262 may change to another color to indicate the change in engine health. In one non-limiting example, the neuron sets 252 and 262 may be displayed in green on the display unit 22. However, any color or shape may be selected as desired.

Figure 14:
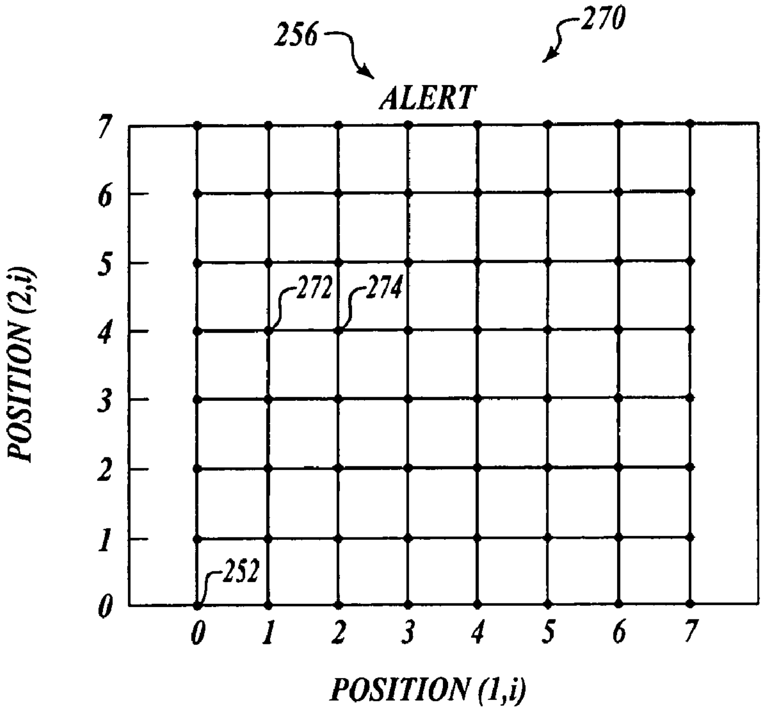
FIG. 14 is an alert ice-build up on fan section neuron set space map.

Referring now to FIG. 14, an engine experiencing ice build-up on its fan section yields a neuron set space 270. The neuron set 252 and a neuron set 272 at (1,4) are activated when the engine is operating normally. The neuron sets 252 and 272 may be displayed on the display unit 22 in such a manner as to connote normal operation, such as without limitation being displayed in blue. However, any color (or shape) may be selected as desired. When the engine experiences ice build-up on its fan section, the neuron set 252 and a neuron set 274 at (2,4) are activated. The change in neuron sets that are activated reflects a slight change in phase angle of the vector. The title 256 has changed to reflect a changed condition, and may indicate "Alert" or the like, as desired. Further, the appearance of the neuron sets 252 and 274 may change to indicate a change in engine health, such as by changing to another color like green or the like, as desired. However, any color (or shape) may be selected as desired.

Figure 15:
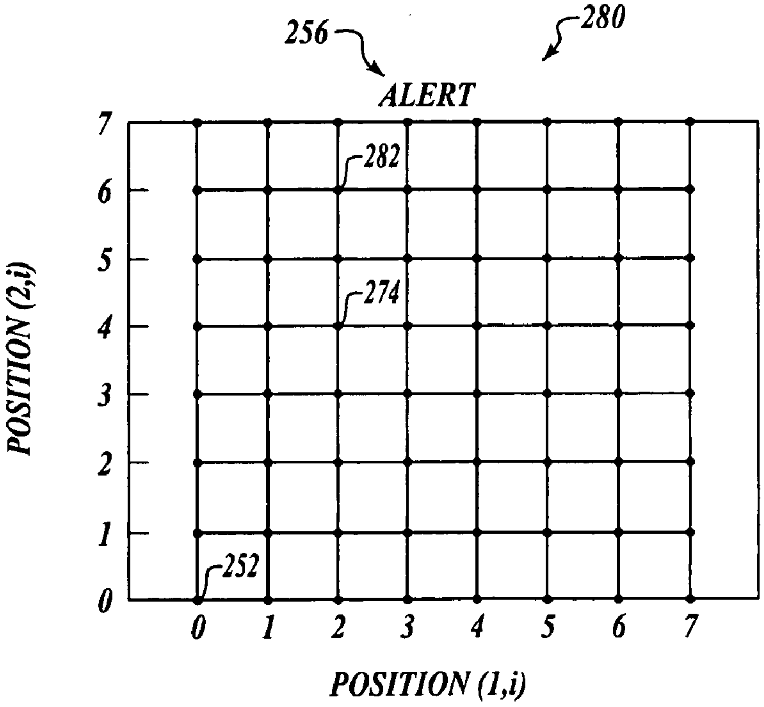
FIG. 15 is a bird strike simulation neuron set space map.

Referring now to FIG. 15, an engine that has experienced a bird strike yields a neuron set space 280. The concept for bird strike monitoring is the same as for ice monitoring (FIG. 14), except that instead of monitoring for a decrease in the vector, the system monitors for an instantaneous impact followed by an increase in the position of the neuron set. The neuron sets 252 and 274 are activated when the engine is operating normally and may be displayed in a manner to connote normal operation, such as without limitation being displayed in blue. When the engine experiences a bird strike, the neuron set 252 and a neuron set 282 at (2,6) are activated. The neuron set 274 is no longer activated. The change in neuron sets that are activated reflects the increase in the position of the neuron set that follows the instantaneous impact of the bird strike. The title 256 has changed to reflect a changed condition, and may indicate "Alert" or the like, as desired. The appearance of the neuron sets 252 and 282 may change to indicate the bird strike, such as by changing to another color like green or the like as desired. However, any color (or shape) may be selected as desired.

Exemplary Aircraft Implementation

Figure 16:
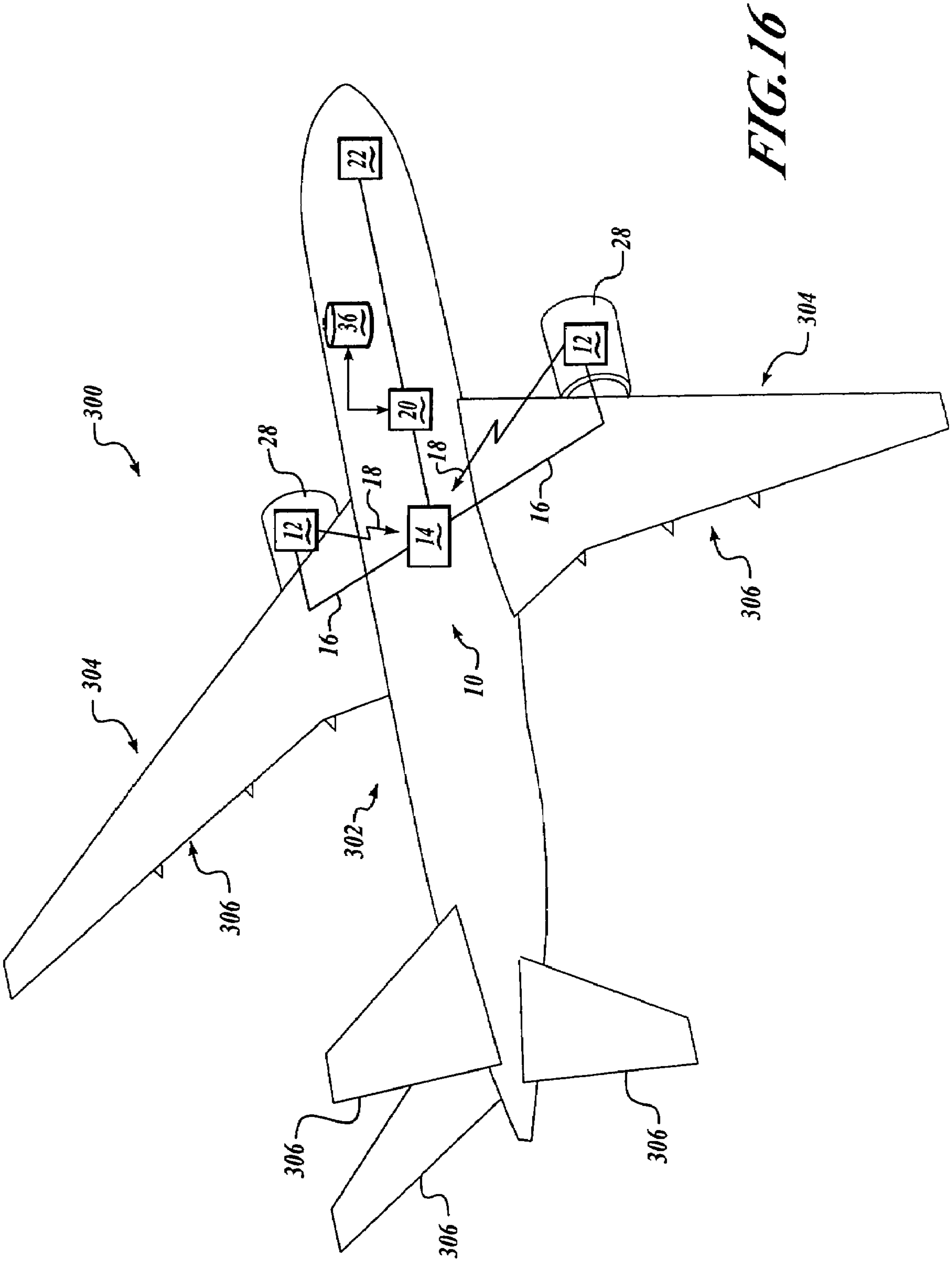
FIG. 16 illustrates an aircraft that includes an exemplary vibration neural network monitor according to an embodiment of the present invention.

Referring now to FIG. 16, an exemplary aircraft 300 includes the system 10 as described above. As is well known, the aircraft 300 also includes a fuselage 302, a pair of engines 28, a pair of wings 304, and control surfaces 306. Outputs of transducers that are mounted on the engines 28 are processed by the neural networks 12 as described above. When abnormal conditions such as bird strikes, FOD events, bird strikes, overspeed events, or the like are detected in accordance with methods described above, appropriate alerts are generated and provided to a flight crew via the display unit 22. However, it will be appreciated that the system 10 advantageously may be used with any engine regardless of the application.

APPENDIX A

```
%Trainconsimxy.m
%Set values of Sim to matrix form.
px=0, py=0, p=0, icet=0;
px=[1 2.3 4 5 6];
py=[1 2 3 4 5 6];
p=[px; py];
net = newc([0 6; 0 6],2);
wts = net.IW{1,1}
net.trainParam.epochs = 1000
net = train(net,p);
a = sim(net,p)
ac = vec2ind(a)
%Make Neuron Map
%New map for neural map
x = 7;
for i = 1:8
  px7(:,i)=x;
end
x=6;
for i = 1:8
  px6(:,i)=x;
end
x=5;
for i = 1:8
  px5(:,i)=x
end
x=4;
for i = 1:8
  px4(:,i)=x;
end
x=3;
for i = 1:8
```

APPENDIX A-continued

```
  px3(:,i)=x;
end
x=2;
for i = 1:8
  px2(:,i)=x;
end
x=1;
for i = 1:8
  px1(:,i)=x;
end
x=0;
for i = 1:8
  px0(:,i)=x;
end
pxmap=[px7 px6 px5 px4 px3 px2 px1 px0];
y = 7;
for i = 1:8
  py1(:,i)=y;
  y=y−1;
end
y=7;
for i = 1:8
  py2(:,i)=y;
  y=y−1;
end
y=7;
for i = 1:8
  py3(:,i)=y;
  y=y−1;
end
y=7;
for i = 1:8
  py4(:,i)=y;
  y=y−1;
end
y=7;
for i = 1:8
  py5(:,i)=y;
  y=y−1;
end
y=7;
for i = 1:8
  py6(:,i)=y;
  y=y−1;
end
y=7;
for i = 1:8
  py7(:,i)=y;
  y=y−1;
end
y=7;
for i = 1:8
  py8(:,i)=y;
  y=y−1;
end
pymap=[py1 py2 py3 py4 py5 py6 py7 py8];
pmapxy=[pxmap
    pymap];
```

APPENDIX B

```
%Icesimxy.m
%Set values of Sim to matrix form.
px=0,py=0,p=0
for i = 1:49
  py(:,i)=simy(:,:,i);
end
for i = 1:49
  px(:,i)=simx(:,:,i);
end
p=[px;
  py];
%Engine Vibration Monitor: Check Engine for Excessive Vibration
ice = 0
a = sim(net,p);
ac = vec2ind(a);
```

APPENDIX B-continued

```
for i = 1:49
   count = ac(:,i);
   if count == 2
      ice = 1
      plot(px,py)
      title('Alert Vibration')
   end
end
%Establish Engine Steady State Operation
%Establish Engine Matrix Neuron Set
if icet == 0
   icetx = 0, icety = 0;
   for i = 1:49
      if px(:,i) < 0.1
         icetx(:,i) = 0;
      elseif px(:,i) <= 0.5
         icetx(:,i) = 1;
      elseif px(:,i) <= 1
         icetx(:,i) = 2;
      elseif px(:,i) <= 1.5
         icetx(:,i) = 3;
      elseif px(:,i) <= 2
         icetx(:,i) = 4;
      elseif px(:,i) <= 2.5
         icetx(:,i) = 5;
      elseif px(:,i) <= 3
         icetx(:,i) = 6;
      else
         icetx(:,i) = 7;
      end
      if py(:,i) < 0.1
         icety(:,i) = 0;
      elseif py(:,i) <= 0.5
         icety(:,i) = 1;
      elseif py(:,i) <= 1
         icety(:,i) = 2;
      elseif py(:,i) <= 1.5
         icety(:,i) = 3;
      elseif py(:,i) <= 2
         icety(:,i) = 4;
      elseif py(:,i) <= 2.5
         icety(:,i) = 5;
      elseif py(:,i) <= 3
         icety(:,i) = 6;
      else
         icety(:,i) = 7;
      end
   end
   icet = 1;
end
Engineset=[icetx
      icety];
%Visual plot of neuron activation
figure
hold on
plotsom(pmapxy)
for i = 1:49
   plot(icetx(:,i),icety(:,i),'b*')
end
%Engine Ice Monitoring
%Engine Ice Monitoring Occurs at Slow Fan Speeds
if ice == 0
   icecreamx=0;,icecreamy=0;
   for i = 1:49
      if px(:,i) < 0.1
         icecreamx(:,i) = 0;
      elseif px(:,i) <= 0.5
         icecreamx(:,i) = 1;
      elseif px(:,i) <= 1
         icecreamx(:,i) = 2;
      elseif px(:,i) <= 1.5
         icecreamx(:,i) = 3;
      elseif px(:,i) <= 2
         icecreamx(:,i) = 4;
      elseif px(:,i) <= 2.5
         icecreamx(:,i) = 5;
      elseif px(:,i) <= 3
         icecreamx(:,i) = 6;
      else
         icecreamx(:,i) = 7;
      end
      if py(:,i) < 0.1
         icecreamy(:,i) = 0;
      elseif py(:,i) <= 0.5
         icecreamy(:,i) = 1;
      elseif py(:,i) <= 1
         icecreamy(:,i) = 2;
      elseif py(:,i) <= 1.5
         icecreamy(:,i) = 3;
      elseif py(:,i) <= 2
         icecreamy(:,i) = 4;
      elseif py(:,i) <= 2.5
         icecreamy(:,i) = 5;
      elseif py(:,i) <= 3
         icecreamy(:,i) = 6;
      else
         icecreamy(:,i) = 7;
      end
   end
end
Icecream=[icecreamx
      icecreamy];
for i = 1:49
   if Engineset(:,i)~=Icecream(:,i)
      title('ALERT')
      plot(icecreamx(:,i),icecreamy(:,i),'g*')
   end
end
```

APPENDIX C

```
px = 0
py = 0
p = 0
wts = 3 3
      3 3
net =
   Neural Network object:
   architecture:
      numInputs: 1
      numLayers: 1
     biasConnect: [1]
    inputConnect: [1]
    layerConnect: [0]
   outputConnect: [1]
   targetConnect: [0]
      numOutputs: 1 (read-only)
      numTargets: 0 (read-only)
   numInputDelays: 0 (read-only)
   numLayerDelays: 0 (read-only)
   subobject structures:
          inputs: {1×1 cell} of inputs
          layers: {1×1 cell} of layers
        outputs: {1×1 cell} containing 1 output
        targets: {1×1 cell} containing no targets
          biases: {1×1 cell} containing 1 bias
    inputWeights: {1×1 cell} containing 1 input weight
    layerWeights: {1×1 cell} containing no layer weights
   functions:
      adaptFcn: 'trains'
       initFcn: 'initlay'
     performFcn: (none)
      trainFcn: 'trainr'
   parameters:
      adaptParam: .passes
      initParam: (none)
    performParam: (none)
     trainParam: .epochs, .goal, .show, .time
   weight and bias values:
          IW: {1×1 cell} containing 1 input weight matrix
          LW: {1×1 cell} containing no layer weight matrices
        b: {1×1 cell} containing 1 bias vector
   other:
        userdata: (user stuff)
TRAINR, Epoch 0/1000
```

APPENDIX C-continued

```
TRAINR, Epoch 25/1000
TRAINR, Epoch 50/1000
TRAINR, Epoch 75/1000
TRAINR, Epoch 100/1000
TRAINR, Epoch 125/1000
TRAINR, Epoch 150/1000
TRAINR, Epoch 175/1000
TRAINR, Epoch 200/1000
TRAINR, Epoch 225/1000
TRAINR, Epoch 250/1000
TRAINR, Epoch 275/1000
TRAINR, Epoch 300/1000
TRAINR, Epoch 325/1000
TRAINR, Epoch 350/1000
TRAINR, Epoch 375/1000
TRAINR, Epoch 400/1000
TRAINR, Epoch 425/1000
TRAINR, Epoch 450/1000
TRAINR, Epoch 475/1000
TRAINR, Epoch 500/1000
TRAINR, Epoch 525/1000
TRAINR, Epoch 550/1000
TRAINR, Epoch 575/1000
TRAINR, Epoch 600/1000
TRAINR, Epoch 625/1000
TRAINR, Epoch 650/1000
TRAINR, Epoch 675/1000
TRAINR, Epoch 700/1000
TRAINR, Epoch 725/1000
TRAINR, Epoch 750/1000
TRAINR, Epoch 775/1000
TRAINR, Epoch 800/1000
TRAINR, Epoch 825/1000
TRAINR, Epoch 850/1000
TRAINR, Epoch 875/1000
TRAINR, Epoch 900/1000
TRAINR, Epoch 925/1000
TRAINR, Epoch 950/1000
TRAINR, Epoch 975/1000
TRAINR, Epoch 1000/1000
TRAINR, Maximum epoch reached.
a =
   (1,1)   1
   (1,2)   1
   (1,3)   1
   (2,4)   1
   (2,5)   1
   (2,6)   1
ac =
   1  1  1  2  2  2
EDU>>
```

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of monitoring vibration of an engine, the method comprising:

sensing a pattern of vibration of an engine;

determining whether magnitude of the vibration exceeds a predetermined threshold;

analyzing the pattern of vibration when the magnitude of the vibration exceeds the predetermined threshold; and determining a cause of excessive vibration based upon analysis of the pattern of vibration.

2. The method of claim 1, further comprising learning steady state operation of the engine.

3. The method of claim 2, wherein learning the steady state operation establishes the predetermined threshold.

4. The method of claim 1, further comprising, providing an alert regarding the excessive vibration.

5. The method of claim 4, wherein providing the alert includes suggesting the cause of the excessive vibration.

6. The method of claim 5, wherein the cause includes one of a bird strike, foreign object damage, and failure of a bearing of the engine.

7. The method of claim 1, further comprising analyzing the pattern of vibration when the vibration does not exceed the predetermined threshold.

8. The method of claim 7, wherein the pattern of vibration is analyzed for build-up of ice on a fan section of the engine.

9. The method of claim 8, further comprising providing an alert regarding the build-up of ice.

10. The method of claim 7, wherein the pattern of vibration is analyzed for an over-speed condition.

11. The method of claim 10, further comprising providing an alert regarding the over-speed condition.

12. The method of claim 10, further comprising recording duration of the over-speed condition.

13. The method of claim 1, wherein sensing the vibration of the engine includes determining displacement of a shaft of the engine.

14. The method of claim 13, wherein the predetermined threshold is around $3/1,000$ inch (mils).

15. The method of claim 1, further comprising performing a Hilbert transformation of the sensed vibration of the engine.

16. The method of claim 15, further comprising inputting outputs of the Hilbert transformation into a neural network.

17. The method of claim 16, wherein:

the neural network generates a plurality of neuron set space vectors; and analyzing the pattern includes detecting a phase shift of the neuron set space vectors.

18. A system for monitoring vibration of an engine, the system comprising:

a plurality of accelerometers configured to sense a pattern of vibration of an engine; and a neural network configured to receive a pattern of outputs from the plurality of accelerometers, the neural network including:

a first component configured to determine whether magnitude of the vibration exceeds a predetermined threshold;

a second component configured to analyze the pattern of vibration when the vibration exceeds the predetermined threshold; and a third component configured to determine a cause of the excessive vibration based upon analysis of the pattern of vibration.

19. The system of claim 18, wherein the neural network further includes a fourth component configured to learn steady state operation of the engine.

20. The system of claim 19, wherein the fourth component is further configured to establish the predetermined threshold.

21. The system of claim 18, further comprising a display unit configured to provide an alert from the neural network.

22. The system of claim 21, wherein the display unit is further configured to provide a suggested cause of the excessive vibration.

23. The system of claim 22, wherein the cause includes one of a bird strike, foreign object damage, and failure of a bearing of the engine.

24. The system of claim 21, wherein the neural network further includes a fifth component configured to analyze the pattern of vibration when the vibration does not exceed the predetermined threshold.

25. The system of claim 24, wherein the fifth component is further configured to analyze the pattern of vibration for build-up of ice on a fan section of the engine.

26. The system of claim 24, wherein the fifth component is further configured to analyze the pattern of vibration for an over-speed condition.

27. The system of claim 26, wherein the fifth component is further configured to record duration of the over-speed condition.

28. The system of claim 18, wherein the plurality of accelerometers senses vibration of the engine by determining displacement of a shaft of the engine.

29. The system of claim 28, wherein the predetermined threshold is around 3/1,000 inch (mils).

30. The system of claim 18, further comprising a sixth component configured to perform a Hilbert transformation of the sensed vibration of the engine.

31. The system of claim 30, wherein outputs of the sixth component are input into the neural network.

32. The system of claim 31, wherein:

the neural network generates a plurality of neuron set space vectors; and the second component is further configured to detect a phase shift of the neuron set space vectors.

33. An engine comprising:

a shaft having a first end and a second end;

a fan section coupled to the shaft toward the first end;

an engine core coupled to the shaft toward the second end; and a system for monitoring vibration of the engine, the system including:

a plurality of accelerometers configured to sense a pattern of vibration of an engine; and a neural network configured to receive a pattern of outputs from the plurality of accelerometers, the neural network including:

a first component configured to determine whether magnitude of the vibration exceeds a predetermined threshold;

a second component configured to analyze the pattern of vibration when the vibration exceeds the predetermined threshold; and a third component configured to determine a cause of the excessive vibration based upon analysis of the pattern of vibration.

34. The engine of claim 33, wherein the neural network further includes a fourth component configured to learn steady state operation of the engine.

35. The engine of claim 34, wherein the fourth component is further configured to establish the predetermined threshold.

36. The engine of claim 33, further comprising a display unit configured to provide an alert from the neural network.

37. The engine of claim 36, wherein the display unit is further configured to provide a suggested cause of the excessive vibration.

38. The engine of claim 37, wherein the cause includes one of a bird strike, foreign object damage, and failure of a bearing of the engine.

39. The engine of claim 36, wherein the neural network further includes a fifth component configured to analyze the pattern of vibration when the vibration does not exceed the predetermined threshold.

40. The engine of claim 39, wherein the fifth component is further configured to analyze the pattern of vibration for build-up of ice on a fan section of the engine.

41. The engine of claim 39, wherein the fifth component is further configured to analyze the pattern of vibration for an over-speed condition.

42. The engine of claim 41, wherein the fifth component is further configured to record duration of the over-speed condition.

43. The engine of claim 33, wherein the plurality of accelerometers senses vibration of the engine by determining displacement of a shaft of the engine.

44. The engine of claim 33, wherein the predetermined threshold is around 3/1,000 inch (mils).

45. The engine of claim 33, further comprising a sixth component configured to perform a Hilbert transformation of the sensed vibration of the engine.

46. The engine of claim 45, wherein outputs of the sixth component are input into the neural network.

47. The engine of claim 46, wherein:

the neural network generates a plurality of neuron set space vectors; and the second component is further configured to detect a phase shift of the neuron set space vectors.

48. An aircraft comprising:

a fuselage;

a pair of wings; and at least one engine including:

a shaft having a first end and a second end;

a fan section coupled to the shaft toward the first end;

an engine core coupled to the shaft toward the second end; and a system for monitoring vibration of the engine, the system including:

a plurality of accelerometers configured to sense a pattern of vibration of an engine; and a neural network configured to receive a pattern of outputs from the plurality of accelerometers, the neural network including:

a first component configured to determine whether magnitude of the vibration exceeds a predetermined threshold;

a second component configured to analyze the pattern of vibration when the vibration exceeds the predetermined threshold; and a third component configured to determine a cause of the excessive vibration based upon analysis of the pattern of vibration.

49. The aircraft of claim 48, further comprising:

a first interface unit provided within the neural network and configured to provide the pattern of vibration; and a second interface unit provided within the fuselage and configured to receive the pattern of vibration.

50. The aircraft of claim 49, wherein the first and second interfaces units are further configured to provide and receive, respectively, the cause of the vibration.

51. The aircraft of claim 49, wherein the first interface units include a transmitter and a receiver, respectively.

52. The aircraft of claim 48, further comprising a fourth component configured to perform a Hilbert transformation of the sensed vibration of the engine.

53. The aircraft of claim 52, wherein outputs of the fourth component are input into the neural network.

54. The aircraft of claim 53, wherein:

the neural network generates a plurality of neuron set space vectors; and the second component is further configured to detect a phase shift of the neuron set space vectors.

55. A computer software program product comprising:

first computer program code means for determining whether magnitude of a sensed pattern of vibration of an engine exceeds a predetermined threshold;

second computer program code means for analyzing the pattern of vibration when the magnitude of the vibration exceeds the predetermined threshold; and third computer program code means for determining a cause of excessive vibration based upon analysis of the pattern of vibration.

56. The computer software program product of claim 55, further comprising fourth computer program code means for learning steady state operation of the engine.

57. The computer software program product of claim 56, wherein the fourth computer program code means establishes the predetermined threshold.

58. The computer software program product of claim 55, further comprising fifth computer program code means for providing an alert regarding the excessive vibration.

59. The computer software program product of claim 58, wherein the fifth computer program code means suggests the cause of the excessive vibration.

60. The computer software program product of claim 59, wherein the cause includes one of a bird strike, foreign object damage, and failure of a bearing of the engine.

61. The computer software program product of claim 55, further comprising sixth computer program code means for analyzing the pattern of vibration when the vibration does not exceed the predetermined threshold.

62. The computer software program product of claim 61, wherein the pattern of vibration is analyzed for build-up of ice on a fan section of the engine.

63. The computer software program product of claim 62, further comprising seventh computer program code means for providing an alert regarding the build-up of ice.

64. The computer software program product of claim 61, wherein the pattern of vibration is analyzed for an over-speed condition.

65. The computer software program product of claim 64, further comprising eighth computer program code means for providing an alert regarding the over-speed condition.

66. The computer software program product of claim 64, further comprising ninth computer program code means for recording duration of the over-speed condition.

67. The computer software program product of claim 55, wherein sensing the vibration of the engine includes determining displacement of a shaft of the engine.

68. The computer software program product of claim 67, wherein the predetermined threshold is around $3/1{,}000$ inch (mils).

69. The computer software program product of claim 55, further comprising tenth computer program code means for performing a Hilbert transformation of the sensed vibration of the engine.

70. The computer software program product of claim 69, wherein outputs of the Hilbert transformation are input into a neural network.

71. The computer software program product of claim 70, wherein:

the neural network generates a plurality of neuron set space vectors; and the second computer program code means detects a phase shift of the neuron set space vectors.

* * * * *